(12) United States Patent
Ezhov et al.

(10) Patent No.: US 12,062,170 B2
(45) Date of Patent: Aug. 13, 2024

(54) SYSTEM AND METHOD FOR CLASSIFYING A TOOTH CONDITION BASED ON LANDMARKED ANTHROPOMORPHIC MEASUREMENTS

(71) Applicant: Diagnocat Inc., Wilmington, DE (US)

(72) Inventors: Matvey Dmitrievich Ezhov, Moscow (RU); Vladimir Leonidovich Aleksandrovskiy, Moscow (RU); Evgeny Sergeevich Shumilov, Moscow (RU); Maxim Gusarev, Tiraspol (MD); Maria Golitsyna, Moscow (RU)

(73) Assignee: Diagnocat Inc, Wilmington, DE (US)

(*) Notice: Subject to any disclaimer, the term of this patent is extended or adjusted under 35 U.S.C. 154(b) by 255 days.

(21) Appl. No.: 17/215,315

(22) Filed: Mar. 29, 2021

(65) Prior Publication Data

US 2021/0217170 A1  Jul. 15, 2021

Related U.S. Application Data

(63) Continuation-in-part of application No. 16/783,615, filed on Feb. 6, 2020, now Pat. No. 11,443,423, which
(Continued)

(51) Int. Cl.
*G06T 7/00* (2017.01)
*G06T 3/4007* (2024.01)

(52) U.S. Cl.
CPC .......... *G06T 7/0014* (2013.01); *G06T 3/4007* (2013.01); *G06T 2207/20081* (2013.01);
(Continued)

(58) Field of Classification Search
CPC ................ G06T 7/0014; G06T 3/4007; G06T 2207/20081; G06T 2207/20084;
(Continued)

(56) References Cited

U.S. PATENT DOCUMENTS

| | | | | |
|---|---|---|---|---|
| 2005/0058259 A1* | 3/2005 | Vija | .......................... | G01T 1/17 378/210 |
| 2008/0305187 A1* | 12/2008 | Krege | ..................... | A61P 19/00 424/682 |

(Continued)

OTHER PUBLICATIONS

Park, Sa-Beom & An, So Youn & Han, Won-Jeong & Park, Jong-Tae. (2017). Three-dimensional measurement of periodontal surface area for quantifying inflammatory burden. Journal of Periodontal & Implant Science. 47. 154. 10.5051/jpis.2017.47.3.154. (Year: 2017).*

*Primary Examiner* — Van D Huynh

(74) *Attorney, Agent, or Firm* — Mohamed C. Azeez

(57) ABSTRACT

Disclosed is a system and method for classifying a tooth condition, comprising: a localization layer; a classification layer; a processor; a non-transitory storage element coupled to the processor; encoded instructions stored in the non-transitory storage element, wherein the encoded instructions when implemented by the processor, configure the automated parsing pipeline system to: localize a present anatomical landmark in a patient's oral or maxillofacial region depicted in a parsed image frame by the localization layer, said landmark comprising of a feature or features with anatomical or pathological significance; and classify a dental or maxillofacial condition based on measuring any kind of relation between two or more features within and/or between landmarks by the classification layer.

17 Claims, 16 Drawing Sheets

Related U.S. Application Data is a continuation-in-part of application No. 16/175,067, filed on Oct. 30, 2018, now Pat. No. 10,991,091.

(52) U.S. Cl.
CPC ............... *G06T 2207/20084* (2013.01); *G06T 2207/20101* (2013.01); *G06T 2207/30036* (2013.01)

(58) Field of Classification Search
CPC . G06T 2207/20101; G06T 2207/30036; G06T 2207/10081; G06T 7/11; G06T 7/0012
USPC ......................................................... 382/224
See application file for complete search history.

(56) References Cited

U.S. PATENT DOCUMENTS

| | | | |
|---|---|---|---|
| 2013/0022252 A1* | 1/2013 | Chen ..................... | G06T 3/4038 382/131 |
| 2014/0314776 A1* | 10/2014 | Ke .......................... | A61P 19/00 424/139.1 |
| 2019/0180143 A1* | 6/2019 | Lyu ........................... | G06T 1/20 |
| 2020/0146646 A1* | 5/2020 | Tuzoff ....................... | G06T 7/11 |
| 2023/0047067 A1* | 2/2023 | Kopelman ........... | A61B 5/7264 |

* cited by examiner

SYSTEM AND METHOD FOR CLASSIFYING A TOOTH CONDITION BASED ON LANDMARKED ANTHROPOMORPHIC MEASUREMENTS

BACKGROUND

Field

This invention relates generally to medical diagnostics, and more specifically to an automated parsing pipeline system and method for anatomical localization and condition classification. More specifically, it relates to the construction of an EoI-focused panorama of a teeth arch. Further, it relates to a system and method for classifying a tooth condition based on landmarked anthropomorphic measurements.

Related Art

Modern image generation systems play an important role in disease detection and treatment planning. Few existing systems and methods were discussed as follows. One common method utilized is dental radiography, which provides dental radiographic images that enable the dental professional to identify many conditions that may otherwise go undetected and to see conditions that cannot be identified clinically. Another technology is cone beam computed tomography (CBCT) that allows to view structures in the oral-maxillofacial complex in three dimensions. Hence, cone beam computed tomography technology is most desired over the dental radiography.

However, CBCT includes one or more limitations, such as time consumption and complexity for personnel to become fully acquainted with the imaging software and correctly using digital imaging and communications in medicine (DICOM) data. American Dental Association (ADA) also suggests that the CBCT image should be evaluated by a dentist with appropriate training and education in CBCT interpretation. Further, many dental professionals who incorporate this technology into their practices have not had the training required to interpret data on anatomic areas beyond the maxilla and the mandible. To address the foregoing issues, deep learning has been applied to various medical imaging problems to interpret the generated images, but its use remains limited within the field of dental radiography. Further, most applications only work with 2D X-ray images.

Another existing article entitled "Teeth and jaw 3D reconstruction in stomatology". Proceedings of the International Conference on Medical Information Visualisation-BioMedical Visualisation, pp 23-28, 2007, researchers Krsek et al. describe a method dealing with problems of 3D tissue reconstruction in stomatology. In this process, 3D geometry models of teeth and jaw bones were created based on input (computed tomography) CT image data. The input discrete CT data were segmented by a nearly automatic procedure, with manual correction and verification. Creation of segmented tissue 3D geometry models was based on vectorization of input discrete data extended by smoothing and decimation. The actual segmentation operation was primarily based on selecting a threshold of Hounsfield Unit values. However, this method fails to be sufficiently robust for practical use.

Another existing U.S. Pat. No. 8,849,016, entitled "Panoramic image generation from CBCT dental images" to Shoupu Chen et al. discloses a method for forming a panoramic image from a computed tomography image volume, acquires image data elements for one or more computed tomographic volume images of a subject, identifies a subset of the acquired computed tomographic images that contain one or more features of interest and defines, from the subset of the acquired computed tomographic images, a sub-volume having a curved shape that includes one or more of the contained features of interest. The curved shape is unfolded by defining a set of unfold lines wherein each unfold line extends at least between two curved surfaces of the curved shape sub-volume and re-aligning the image data elements within the curved shape sub-volume according to a re-alignment of the unfold lines. One or more views of the unfolded sub-volume are displayed.

Another existing patent application number US20080232539, entitled "Method for the reconstruction of a panoramic image of an object, and a computed tomography scanner implementing said method" to Alessandro Pasini et al. discloses a method for the reconstruction of a panoramic image of the dental arches of a patient, a computer program product, and a computed tomography scanner implementing said method. The method involves acquiring volumetric tomographic data of the object; extracting from the volumetric tomographic data tomographic data corresponding to at least three sections of the object identified by respective mutually parallel planes; determining on each section extracted, a respective trajectory that a profile of the object follows in an area corresponding to said section; determining a first surface transverse to said planes such as to comprise the trajectories, and generating the panoramic image on the basis of a part of the volumetric tomographic data identified as a function of said surface. However, the above references also fail to address the afore discussed problems regarding the cone beam computed tomography technology and image generation system, not to mention an automated anatomical localization and pathology detection/classification means.

Furthermore, there is a need for classifying a tooth condition based on localizing a tooth landmark and based on features of said landmark, determine a tooth condition. Therefore, there is a need for an automated parsing pipeline system and method for anatomical and/or landmark localization for condition classification, with minimal image analysis training and visual ambiguities.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. Embodiments disclosed include an automated parsing pipeline system and method for anatomical localization and condition classification. Further embodiments disclosed include a method and system for constructing a panorama with elements of interest (EoI) emphasized of a teeth arch or any point of interest in a oral-maxillofacial complex.

In an embodiment, the system comprises an input event source, a memory unit in communication with the input event source, a processor in communication with the memory unit, a volumetric image processor in communication with the processor, a voxel parsing engine in communication with the volumetric image processor and a localizing layer in communication with the voxel parsing engine. In one embodiment, the memory unit is a non-transitory storage element storing encoded information. In one embodiment, at least one volumetric image data is received from the input event source by the volumetric image processor. In one embodiment, the input event source is a radio-image gathering source.

The processor is configured to parse the at least one received volumetric image data into at least a single image frame field of view by the volumetric image processor. The processor is further configured to localize anatomical structures residing in the at least single field of view by assigning at least one of a pixel and voxel a distinct anatomical structure by the voxel parsing engine. In one embodiment, the single image frame field of view is pre-processed for localization, which involves rescaling using linear interpolation. The pre-processing involves use of any one of a normalization schemes to account for variations in image value intensity depending on at least one of an input or output of volumetric image. In one embodiment, localization is achieved using any one of a fully convolutional network (FCN) or plain classification convolutional neural network (CNN).

The processor is further configured to select at least one of all pixels and voxels (p/v) belonging to the localized anatomical structure by finding a minimal bounding rectangle around the p/v and the surrounding region for cropping as a defined anatomical structure by the localization layer. The bounding rectangle extends equally in all directions to capture the tooth and surrounding context. In one embodiment, the automated parsing pipeline system further comprises a detection module. The processor is configured to detect or classify the conditions for each defined anatomical structure within the cropped image by a detection module or classification layer. In one embodiment, the classification is achieved using any one of a fully convolutional network or plain classification convolutional neural network (FCN/CNN).

In another embodiment, an automated parsing pipeline method for anatomical localization and condition classification is disclosed. At one step, at least one volumetric image data is received from an input event source by a volumetric image processor. At another step, the received volumetric image data is parsed into at least a single image frame field of view by the volumetric image processor. At another step, the single image frame field of view is pre-processed by controlling image intensity value by the volumetric image processor. At another step, the anatomical structure residing in the single pre-processed field of view is localized by assigning each p/v a distinct anatomical structure ID by the voxel parsing engine. At another step, all p/v belonging to the localized anatomical structure is selected by finding a minimal bounding rectangle around the voxels and the surrounding region for cropping as a defined anatomical structure by the localization layer. In another embodiment, the method includes a step of, classifying the conditions for each defined anatomical structure within the cropped image by the classification layer.

In another embodiment, an automated parsing pipeline method for landmark localization and condition classification is disclosed. At one step, at least one volumetric image data is received from an input event source by a volumetric image processor. At another step, the received volumetric image data is parsed into at least a single image frame field of view by the volumetric image processor. At another step, a landmark structure residing in the single field of view is localized by assigning each p/v a distinct landmark structure ID by the voxel parsing engine. At another step, all p/v belonging to the localized landmark structure is selected by finding a minimal bounding rectangle around the voxels and the surrounding region for cropping as a defined landmark structure by the localization layer. In another embodiment, the method further includes a step of, classifying the conditions for each defined landmark structure within the cropped image by the classification layer by performing anthropomorphic measurements around certain features of a landmark or landmarks.

Other embodiments of this aspect include corresponding computer systems, apparatus, and computer programs recorded on one or more computer storage devices, each configured to perform the actions of the methods.

DETAILED DESCRIPTION

Specific embodiments of the invention will now be described in detail with reference to the accompanying FIGS. 1A-7. In the following detailed description of embodiments of the invention, numerous specific details are set forth in order to provide a more thorough understanding of the invention. In other instances, well-known features have not been described in detail to avoid obscuring the invention. Embodiments disclosed include an automated parsing pipeline system and method for anatomical localization and condition classification.

Figure 1A:
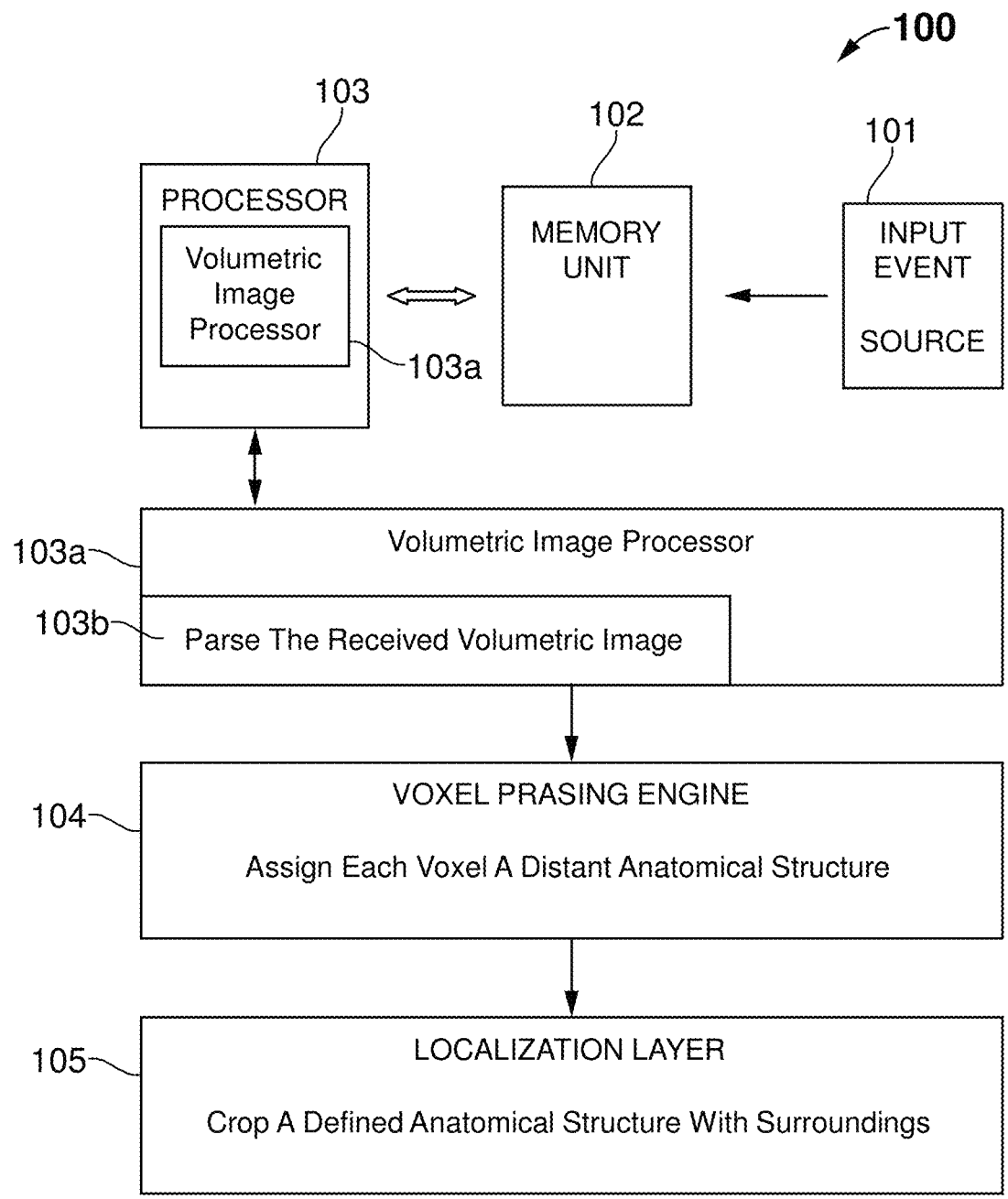
FIG. 1A illustrates in a block diagram, an automated parsing pipeline system for anatomical localization and condition classification, according to an embodiment.

FIG. 1A illustrates a block diagram 100 of the system comprising an input event source 101, a memory unit 102 in communication with the input event source 101, a processor 103 in communication with the memory unit 102, a volumetric image processor 103a in communication with the processor 103, a voxel parsing engine 104 in communication with the volumetric image processor 103a and a localizing layer 105 in communication with the voxel parsing engine 104. In an embodiment, the memory unit 102 is a non-transitory storage element storing encoded information. The encoded instructions when implemented by the processor 103, configure the automated pipeline system to localize an anatomical structure and classify the condition of the localized anatomical structure.

In one embodiment, an input data is provided via the input event source 101. In one embodiment, the input data is a volumetric image data and the input event source 101 is a radio-image gathering source. In one embodiment, the input data is a 2-Dimensional (2D) image data. In another embodiment, the input data is a 3-Dimensional (3D) image data. The volumetric image processor 103a is configured to receive the volumetric image data from the radio-image gathering source. Initially, the volumetric image data is pre-processed, which involves conversion of 3-D pixel array into an array of Hounsfield Unit (HU) radio intensity measurements.

The processor 103 is further configured to parse at least one received image or volumetric image data 103b (i/v.i) into at least a single image frame field of view by the volumetric image processor. The processor 103 is further configured to localize anatomical structures residing in the single image frame field of view by assigning at least one of each a pixel or voxel (p/v) a distinct anatomical structure by the voxel parsing engine 104. In one embodiment, the single image frame field of view is pre-processed for localization, which involves rescaling using linear interpolation. The pre-processing involves use of any one of a normalization schemes to account for variations in image value intensity depending on at least one of an input or output of an image or volumetric image (i/v.i). In one embodiment, localization is achieved using any one of fully convolutional network or plain classification convolutional neural network (FCN/CNN), such as a V-Net-based fully convolutional neural network. In one embodiment, the V-Net is a 3D generalization of UNet.

The processor 103 is further configured to select all p/v belonging to the localized anatomical structure by finding a minimal bounding rectangle around the p/v and the surrounding region for cropping as a defined anatomical structure by the localization layer. The bounding rectangle extends equally in all directions to capture the tooth and surrounding context. In one embodiment, the bounding rectangle may extend 8-15 mm in all directions to capture the tooth and surrounding context.

Figure 1B:
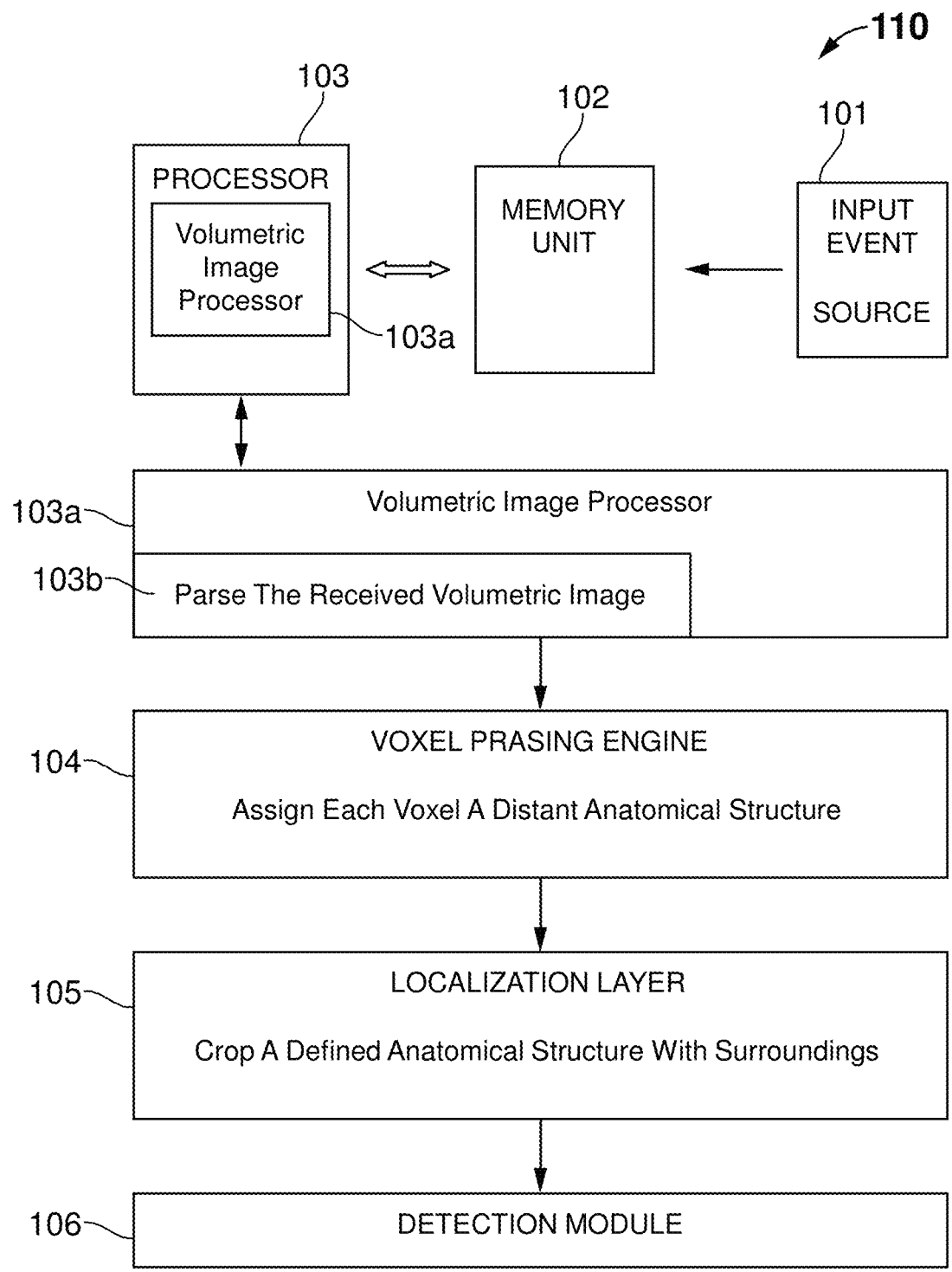
FIG. 1B illustrates in a block diagram, an automated parsing pipeline system for anatomical localization and condition classification, according to another embodiment.

FIG. 1B illustrates in a block diagram 110, an automated parsing pipeline system for anatomical localization and condition classification, according to another embodiment. The automated parsing pipeline system further comprises a detection module 106. The processor 103 is configured to detect or classify the conditions for each defined anatomical structure within the cropped image by a detection module or classification layer 106. In one embodiment, the classification is achieved using any one of a FCN/CNN, such as a DenseNet 3-D convolutional neural network.

In one embodiment, the localization layer 105 includes 33 class semantic segmentation in 3D. In one embodiment, the system is configured to classify each p/v as one of 32 teeth or background and resulting segmentation assigns each p/v to one of 33 classes. In another embodiment, the system is configured to classify each p/v as either tooth or other anatomical structure of interest. In case of localizing only teeth, the classification includes, but not limited to, 2 classes. Then individual instances of every class (teeth) could be split, e.g. by separately predicting a boundary between them. In some embodiments, the anatomical structure being localized, includes, but not limited to, teeth, upper and lower jaw bone, sinuses, lower jaw canal and joint.

In one embodiment, the system utilizes fully-convolutional network. In another embodiment, the system works on downscaled images (typically from 0.1-0.2 mm i/v.i resolution to 1.0 mm resolution) and grayscale (1-channel) image (say, 1×100×100×100-dimensional tensor). In yet another embodiment, the system outputs 33-channel image (say, 33×100×100×100-dimensional tensor) that is interpreted as a probability distribution for non-tooth vs. each of 32 possible (for adult human) teeth, for every p/v.

In an alternative embodiment, the system provides 2-class segmentation, which includes labelling or classification, if the localization comprises tooth or not. The system additionally outputs assignment of each tooth p/v to a separate "tooth instance".

In one embodiment, the system comprises FCN/CNN (such as VNet) predicting multiple "energy levels", which are later used to find boundaries. In another embodiment, a recurrent neural network could be used for step by step prediction of tooth, and keep track of the teeth that were outputted a step before. In yet another embodiment, Mask-RCNN generalized to 3D could be used by the system. In yet another embodiment, the system could take multiple crops from 3D image in original resolution, perform instance segmentation, and then join crops to form mask for all original image. In another embodiment, the system could apply either segmentation or object detection in 2D, to segment axial slices. This would allow to process images in original resolution (albeit in 2D instead of 3D) and then infer 3D shape from 2D segmentation.

In one embodiment, the system could be implemented utilizing descriptor learning in the multitask learning framework i.e., a single network learning to output predictions for multiple dental conditions. This could be achieved by balancing loss between tasks to make sure every class of every task have approximately same impact on the learning. The loss is balanced by maintaining a running average gradient that network receives from every class*task and normalizing it. Alternatively, descriptor learning could be achieved by teaching network on batches consisting data about a single condition (task) and sample examples into these batches in such a way that all classes will have same number of examples in batch (which is generally not possible in multitask setup). Further, standard data augmentation could be applied to 3D tooth images to perform scale, crop, rotation, vertical flips. Then, combining all augmentations and final image resize to target dimensions in a single affine transform and apply all at once.

Advantageously, in some embodiments, to accumulate positive cases faster, a weak model could be trained and ran for all of the unlabeled data. From resulting predictions, teeth model that yield high scores on some rare pathology of interest are selected. Then the teeth are sent to be labelled and added to the dataset (both positive and negative labels). This allows to quickly and cost-efficiently build up a more balanced dataset for rare pathologies.

In some embodiments, the system could use coarse segmentation mask from localizer as an input instead of tooth image. In some embodiments, the descriptor could be trained to output fine segmentation mask from some of the intermediate layers. In some embodiments, the descriptor could be trained to predict tooth number.

As an alternative to multitask learning approach, "one network per condition" could be employed, i.e. models for different conditions are completely separate models that share no parameters. Another alternative is to have a small shared base network and use separate subnetworks connected to this base network, responsible for specific conditions/diagnoses.

Figure 2A:
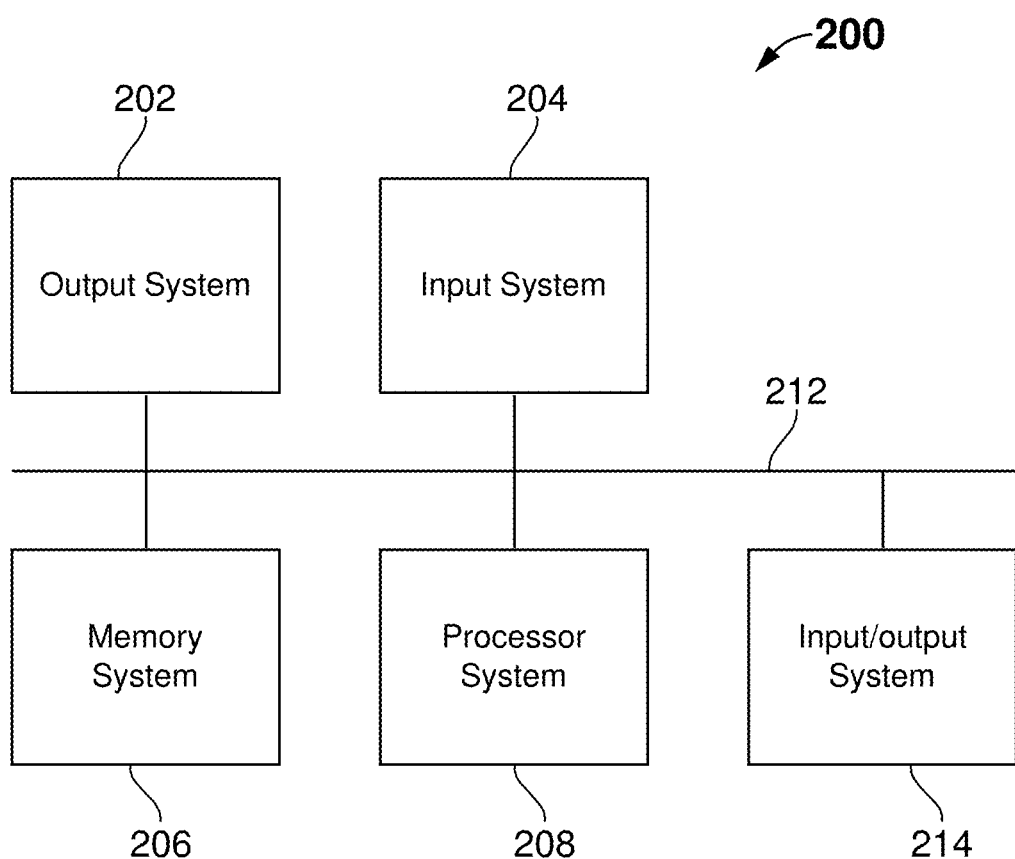
FIG. 2A illustrates in a block diagram, an automated parsing pipeline system for anatomical localization and condition classification according to yet another embodiment.
Figure 2B:
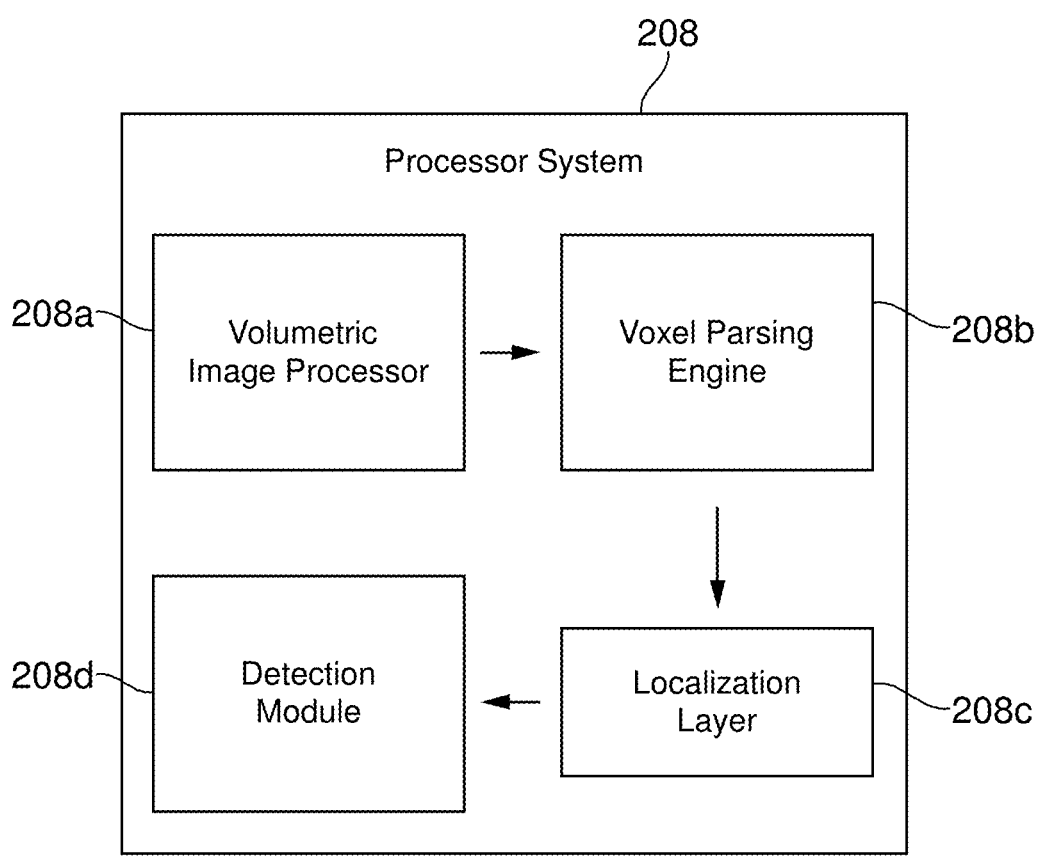
FIG. 2B illustrates in a block diagram, a processor system according to an embodiment.

FIG. 2A illustrates in a block diagram 200, an automated parsing pipeline system for anatomical localization and condition classification according to yet another embodiment. In an embodiment, the system comprises an input system 204, an output system 202, a memory system or unit 206, a processor system 208, an input/output system 214 and an interface 212. Referring to FIG. 2B, the processor system 208 comprises a volumetric image processor 208a, a voxel parsing engine 208b in communication with the volumetric image processor 208a, a localization layer 208c in communication with the voxel parsing engine 208 and a detection module 208d in communication with the localization module 208c. The processor 208 is configured to receive at least one i/v.i via an input system 202. At least one received i/v.i, which may be comprised of a 2-D or 3-D image. The pixel array is pre-processed to convert into an array of Hounsfield Unit (HU) radio intensity measurements. Then, the processor 208 is configured to parse the received i/v.i into at least a single image frame field of view by the said volumetric image processor 208a.

The anatomical structures residing in the at least single field of view is localized by assigning each p/v a distinct anatomical structure by the voxel parsing engine 208b. The processor 208 is configured to select all p/v belonging to the localized anatomical structure by finding a minimal bounding rectangle around the p/v and the surrounding region for cropping as a defined anatomical structure by the localization layer 208c. Then, the conditions for each defined anatomical structure within the cropped image is classified by a detection module or classification layer 208d.

Figure 3A:
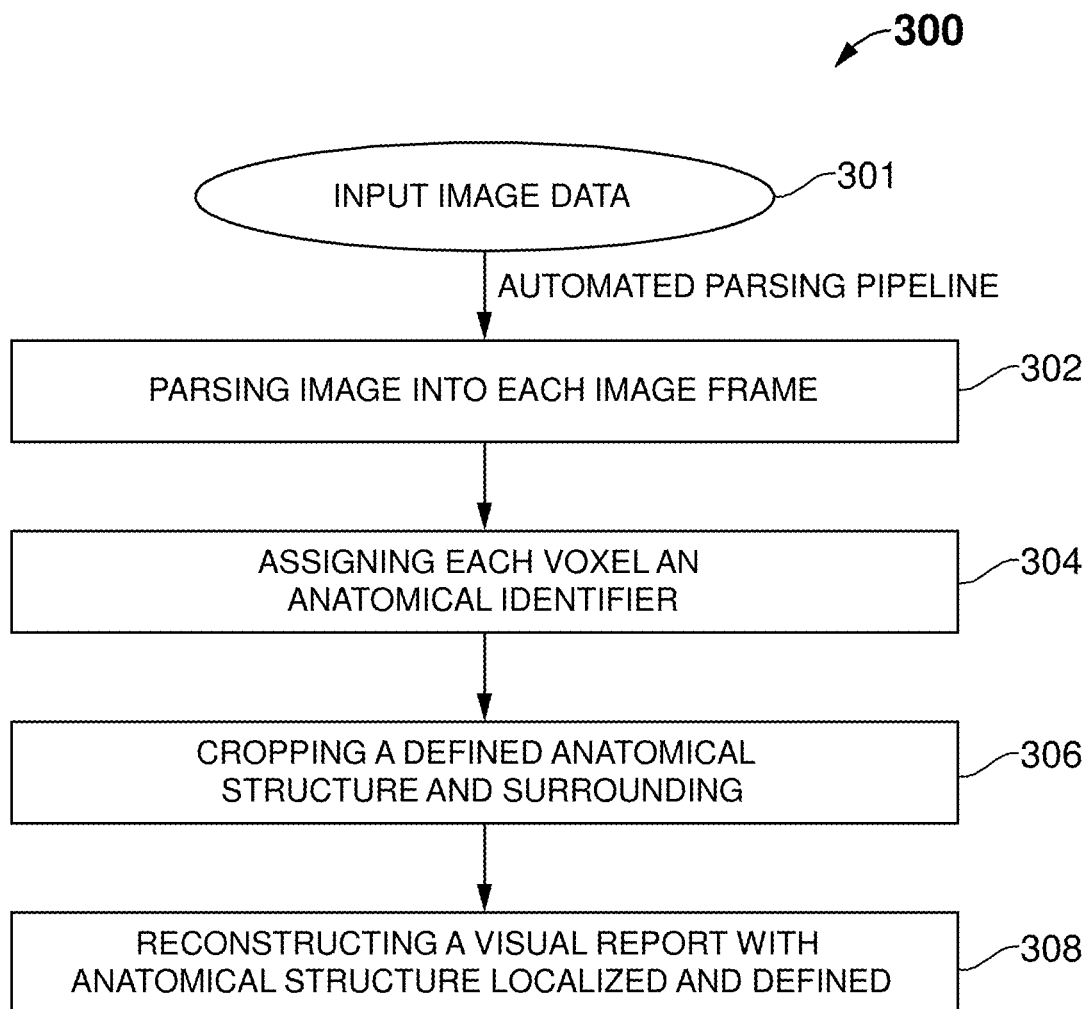
FIG. 3A illustrates in a flow diagram, an automated parsing pipeline method for anatomical localization and condition classification, according to an embodiment.

FIG. 3A illustrates in a flow diagram 300, an automated parsing pipeline method for anatomical localization and condition classification, according to an embodiment. At step 301, an input image data is received. In one embodiment, the image data is a i/v.i. At step 302, the received i/v.i is parsed into at least a single image frame field of view. The parsed i/v.i is pre-processed by controlling image intensity value.

At step 304, a tooth or anatomical structure inside the pre-processed and parsed i/v.i is localized and identified by tooth number. At step 306, the identified tooth and surrounding context within the localized i/v.i are extracted. At step 308, a visual report is reconstructed with localized and defined anatomical structure. In some embodiments, the visual reports include, but not limited to, an endodontic report (with focus on tooth's root/canal system and its treatment state), an implantation report (with focus on the area where the tooth is missing), and a dystopic tooth report for tooth extraction (with focus on the area of dystopic/impacted teeth).

Figure 3B:
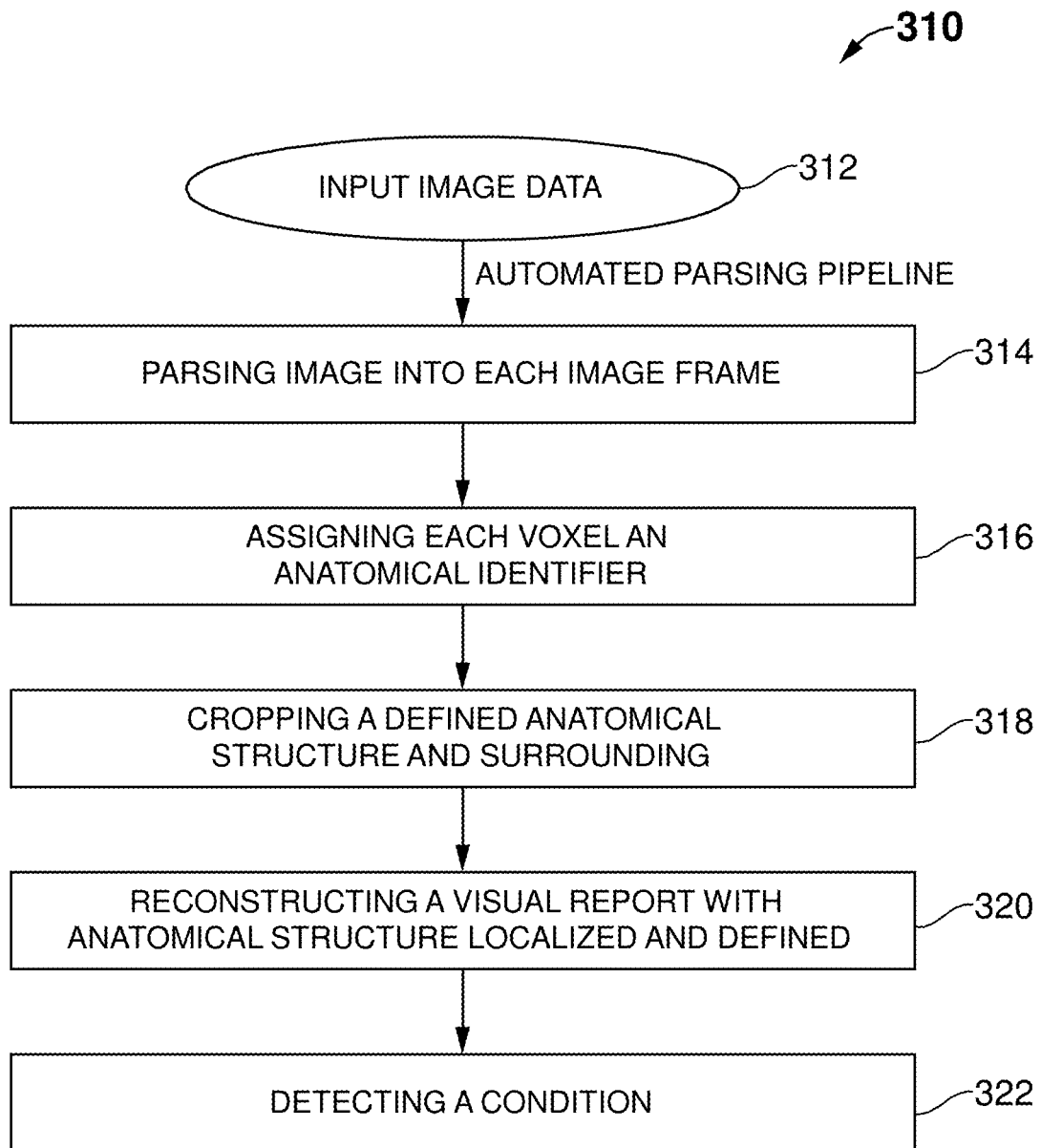
FIG. 3B illustrates in a flow diagram, an automated parsing pipeline method for anatomical localization and condition classification, according to another embodiment.

FIG. 3B illustrates in a flow diagram 310, an automated parsing pipeline method for anatomical localization and condition classification, according to another embodiment. At step 312, at least one i/v.i is received from a radio-image gathering source by a volumetric image processor.

At step 314, the received i/v.i is parsed into at least a single image frame field of view by the volumetric image processor. At least single image frame field of view is pre-processed by controlling image intensity value by the volumetric image processor. At step 316, an anatomical structure residing in the at least single pre-processed field of view is localized by assigning each p/v a distinct anatomical structure ID by the voxel parsing engine. At step 318, all p/v belonging to the localized anatomical structure is selected by finding a minimal bounding rectangle around the p/v and the surrounding region for cropping as a defined anatomical structure by the localization layer. At step 320, a visual report is reconstructed with defined and localized anatomical structure. At step 322, conditions for each defined anatomical structure is classified within the cropped image by the classification layer.

Figure 4:
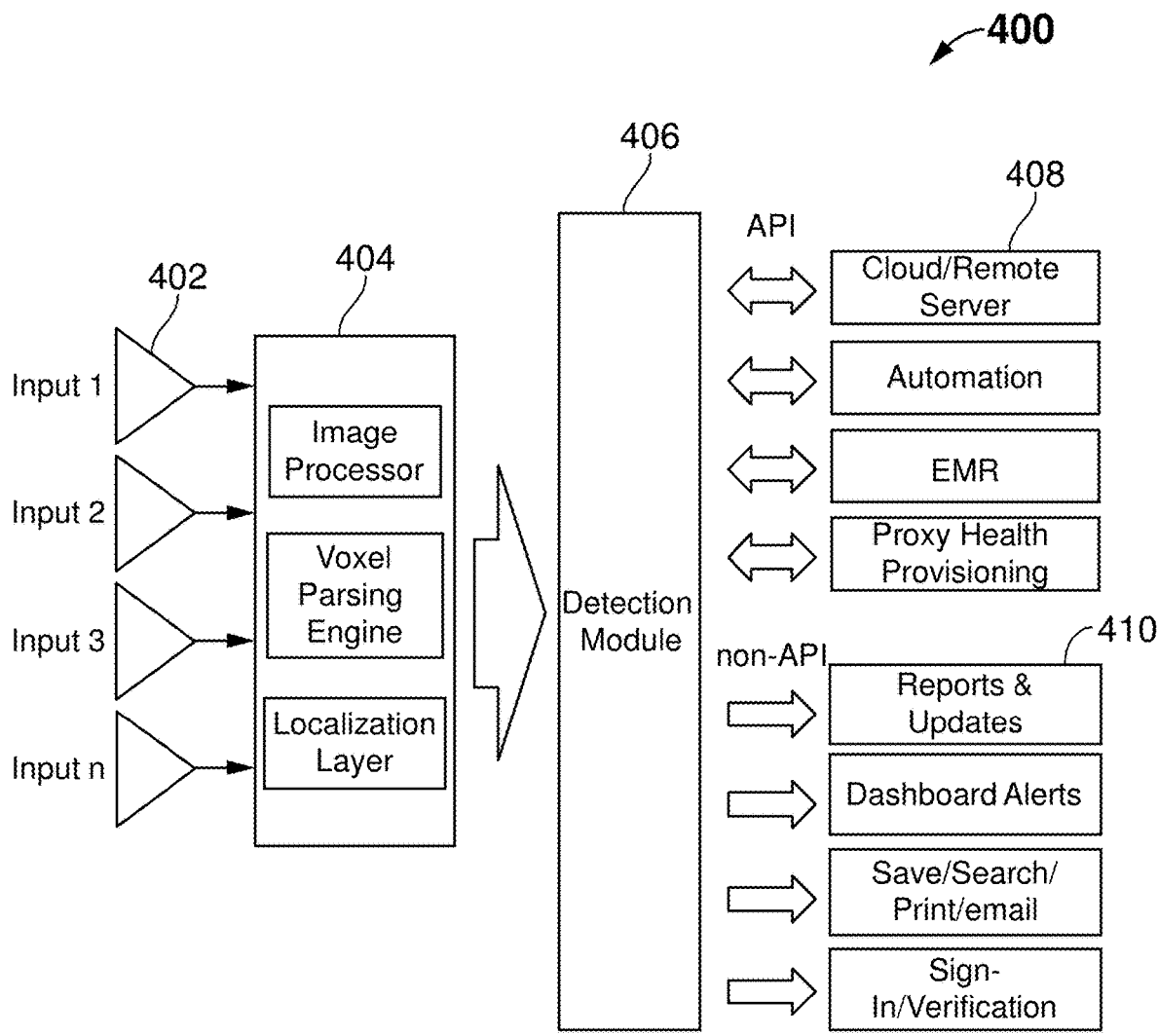
FIG. 4 illustrates in a block diagram, the automated parsing pipeline architecture according to an embodiment.

FIG. 4 illustrates in a block diagram 400, the automated parsing pipeline architecture according to an embodiment. According to an embodiment, the system is configured to receive input image data from a plurality of capturing devices, or input event sources 402. A processor 404 including an image processor, a voxel parsing engine and a localization layer. The image processor is configured to parse image into each image frame and preprocess the parsed image. The voxel parsing engine is configured to configured to localize an anatomical structure residing in the at least single pre-processed field of view by assigning each p/v a distinct anatomical structure ID. The localization layer is configured to select all p/v belonging to the localized anatomical structure by finding a minimal bounding rectangle around the p/v and the surrounding region for cropping as a defined anatomical structure. The detection module 406 is configured to detect the condition of the defined anatomical structure. The detected condition could be sent to the cloud/remote server, for automation, to EMR and to proxy health provisioning 408. In another embodiment, detected condition could be sent to controllers 410. The controllers 410 includes reports and updates, dashboard alerts, export option or store option to save, search, print or email and sign-in/verification unit.

Figure 5:
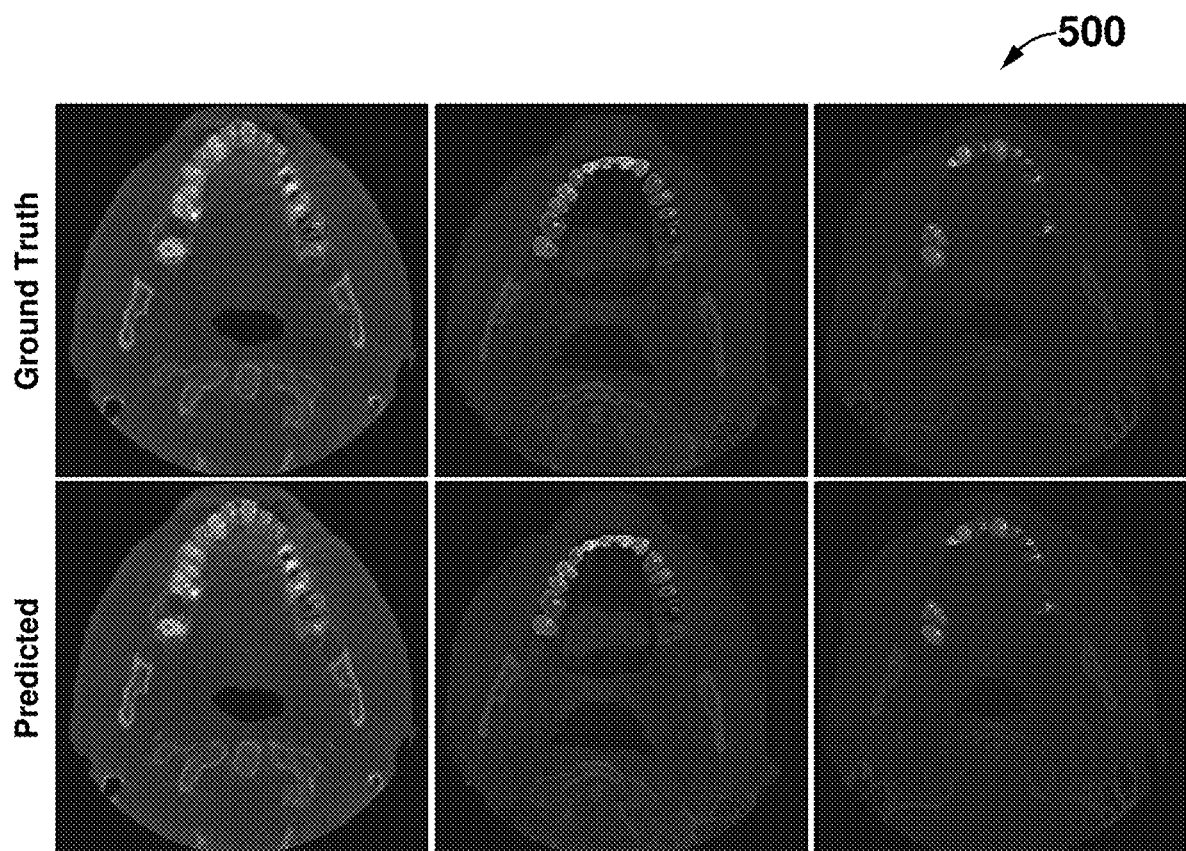
FIG. 5 illustrates in a screenshot, an example of ground truth and predicted masks in an embodiment of the present invention.

Referring to FIG. 5, an example screenshot 500 of tooth localization done by the present system, is illustrated. This figure shows examples of teeth segmentation at axial slices of 3D tensor.

Problem: Formulating the problem of tooth localization as a 33-class semantic segmentation. Therefore, each of the 32 teeth and the background are interpreted as separate classes.

Model: A V-Net-based fully convolutional network is used. V-Net is a 6-level deep, with widths of 32; 64; 128; 256; 512; and 1024. The final layer has an output width of 33, interpreted as a softmax distribution over each voxel, assigning it to either the background or one of 32 teeth. Each block contains 3*3*3 convolutions with padding of 1 and stride of 1, followed by ReLU non-linear activations and a dropout with 0:1 rate. Instance normalization before each convolution is used. Batch normalization was not suitable in this case, as long as there is only one example in batch (GPU memory limits); therefore, batch statistics are not determined.

Different architecture modifications were tried during the research stage. For example, an architecture with 64; 64; 128; 128; 256; 256 units per layer leads to the vanishing gradient flow and, thus, no training. On the other hand, reducing architecture layers to the first three (three down and three up) gives a comparable result to the proposed model, though the final loss remains higher.

Loss function: Let R be the ground truth segmentation with voxel values ri (0 or 1 for each class), and P the predicted probabilistic map for each class with voxel values pi. As a loss function we use soft negative multi-class Jaccard similarity, that can be defined as:

$$\text{Jaccard Multi class Loss} = 1 - \frac{1}{N}\sum_{i=0}^{N} \frac{p_i r_i + \in}{p_i + r_i - p_i r_i + \in'}$$

where N is the number of classes, which in our case is 32, and ε is a loss function stability coefficient that helps to avoid a numerical issue of dividing by zero. Then the model is trained to convergence using an Adam optimizer with learning rate of 1e-4 and weight decay 1e-8. A batch size of 1 is used due to the large memory requirements of using volumetric data and models. The training is stopped after 200 epochs and the latest checkpoint is used (validation loss does not increase after reaching the convergence plateau).

Results: The localization model is able to achieve a loss value of 0:28 on a test set. The background class loss is 0:0027, which means the model is a capable 2-way "tooth/not a tooth" segmentor. The localization intersection over union (IoU) between the tooth's ground truth volumetric bounding box and the model-predicted bounding box is also defined. In the case where a tooth is missing from ground truth and the model predicted any positive p/v (i.e. the ground truth bounding box is not defined), localization IoU is set to 0. In the case where a tooth is missing from ground truth and the model did not predict any positive p/v for it, localization IoU is set to 1. For a human-interpretable metric, tooth localization accuracy which is a percent of teeth is used that have a localization IoU greater than 0:3 by definition. The relatively low threshold value of 0:3 was decided from the manual observation that even low localization IoU values are enough to approximately localize teeth for the downstream processing. The localization model achieved a value of 0:963 IoU metric on the test set, which, on average, equates to the incorrect localization of 1 of 32 teeth.

Figures 6A, 6B, 6C:
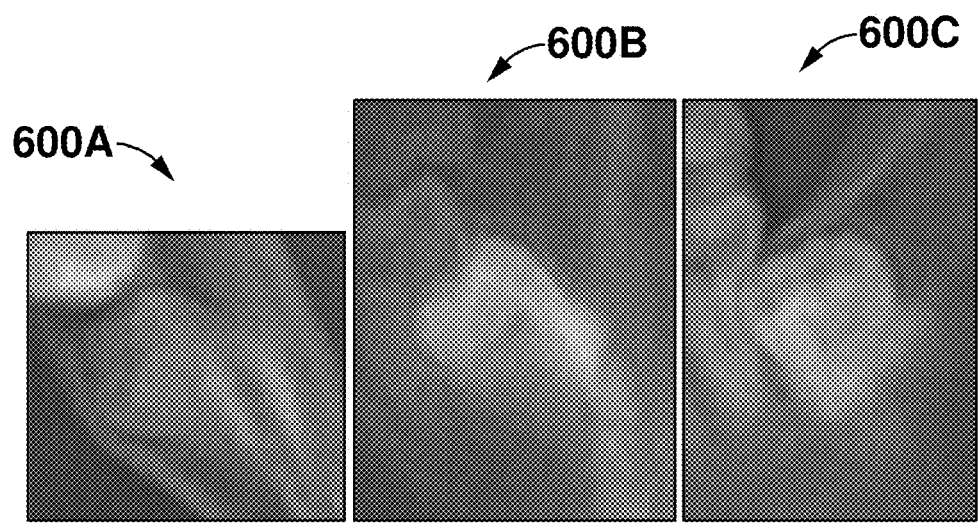
FIG. 6A illustrates in a screenshot, the extraction of anatomical structure by the localization model of the system in an embodiment of the present invention.
FIG. 6B illustrates in a screenshot, the extraction of anatomical structure by the localization model of the system in an embodiment of the present invention.
FIG. 6C illustrates in a screenshot, the extraction of anatomical structure by the localization model of the system in an embodiment of the present invention.

Referring to FIGS. 6A-6C, an example screenshot (600A, 600B, 600B) of tooth sub-volume extraction done by the present system, illustrated.

In order to focus the downstream classification model on describing a specific tooth of interest, the tooth and its surroundings is extracted from the original study as a rectangular volumetric region, centered on the tooth. In order to get the coordinates of the tooth, the upstream segmentation mask is used. The predicted volumetric binary mask of each tooth is preprocessed by applying erosion, dilation, and then selecting the largest connected component. A minimum bounding rectangle is found around the predicted volumetric mask. Then, the bounding box is extended by 15 mm vertically and 8 mm horizontally (equally in all directions) to capture the tooth and surrounding region (tooth context) and to correct possibly weak localizer performance. In other embodiments, the minimum bounding box may be any length in either direction to optimally capture tooth context. Finally, a corresponding sub-volume is extracted from the original clipped image, rescale it to 643 and pass it on to the classifier. An example of a sub-volume bounding box is presented in FIGS. 6A-6C.

Figure 7:
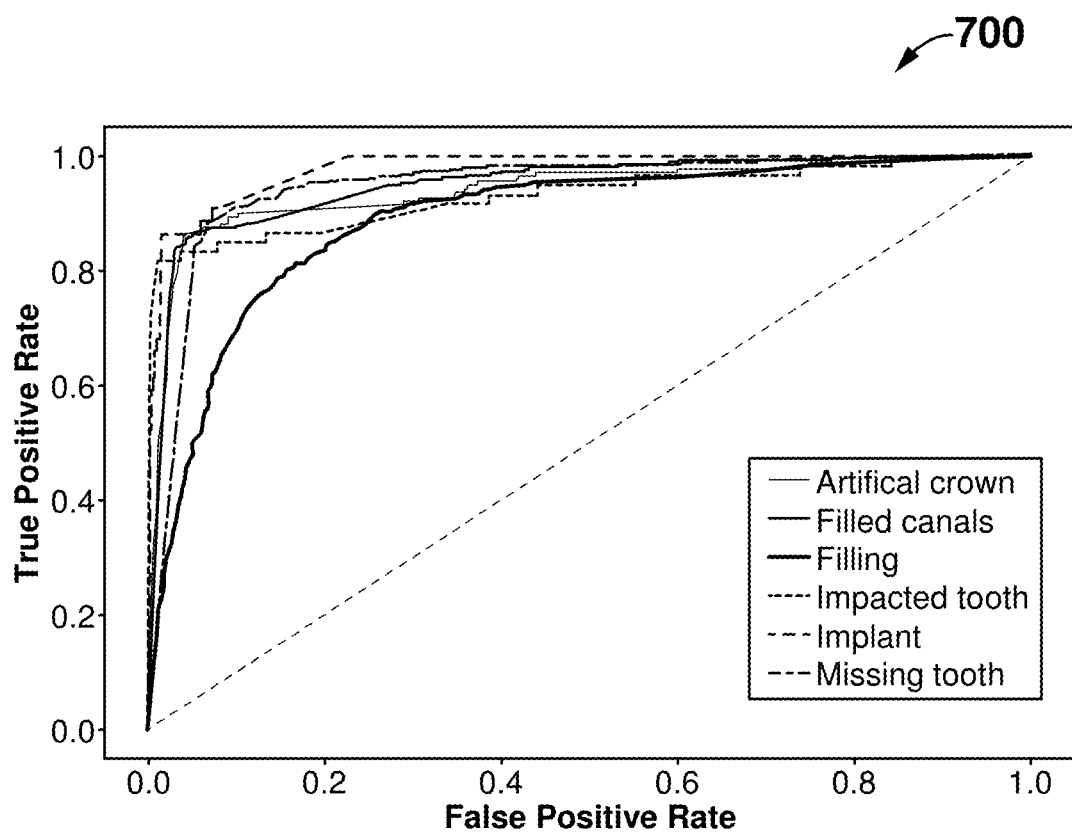
FIG. 7 illustrates in a graph, receiver operating characteristic (ROC) curve of a predicted tooth condition in an embodiment of the present invention.

Referring to FIG. 7, a receiver operating characteristic (ROC) curve 700 of a predicted tooth condition is illustrated.

Model: The classification model has a DenseNet architecture. The only difference between the original and implementation of DenseNet by the present invention is a replacement of the 2D convolution layers with 3D ones. 4 dense blocks of 6 layers is used, with a growth rate of 48, and a compression factor of 0:5. After passing the 643 input through 4 dense blocks followed by down-sampling transitions, the resulting feature map is 548×2×2×2. This feature map is flattened and passed through a final linear layer that outputs 6 logits—each for a type of abnormality.

Loss function: Since tooth conditions are not mutually exclusive, binary cross entropy is used as a loss. To handle class imbalance, weight each condition loss inversely proportional to its frequency (positive rate) in the training set. Suppose that Fi is the frequency of condition i, pi is its predicted probability (sigmoid on output of network) and ti is ground truth. Then: Li=(1=Fi).ti.log pi+Fi.(1−ti).log(1−pi) is the loss function for condition i. The final example loss is taken as an average of the 6 condition losses.

|  | Artificial crowns | Filling canals | Filling | Impacted tooth | Implant | Missing |
| --- | --- | --- | --- | --- | --- | --- |
| ROCAUC | 0.941 | 0.95 | 0.892 | 0.931 | 0.979 | 0.946 |
| Condition frequency | 0.092 | 0.129 | 0.215 | 0.018 | 0.015 | 0.145 |

Results: The classification model achieved average area under the receiver operating characteristic curve (ROC AUC) of 0:94 across the 6 conditions. Per-condition scores are presented in above table. Receiver operating characteristic (ROC) curves 700 of the 6 predicted conditions are illustrated in FIG. 7.

Figure 8:
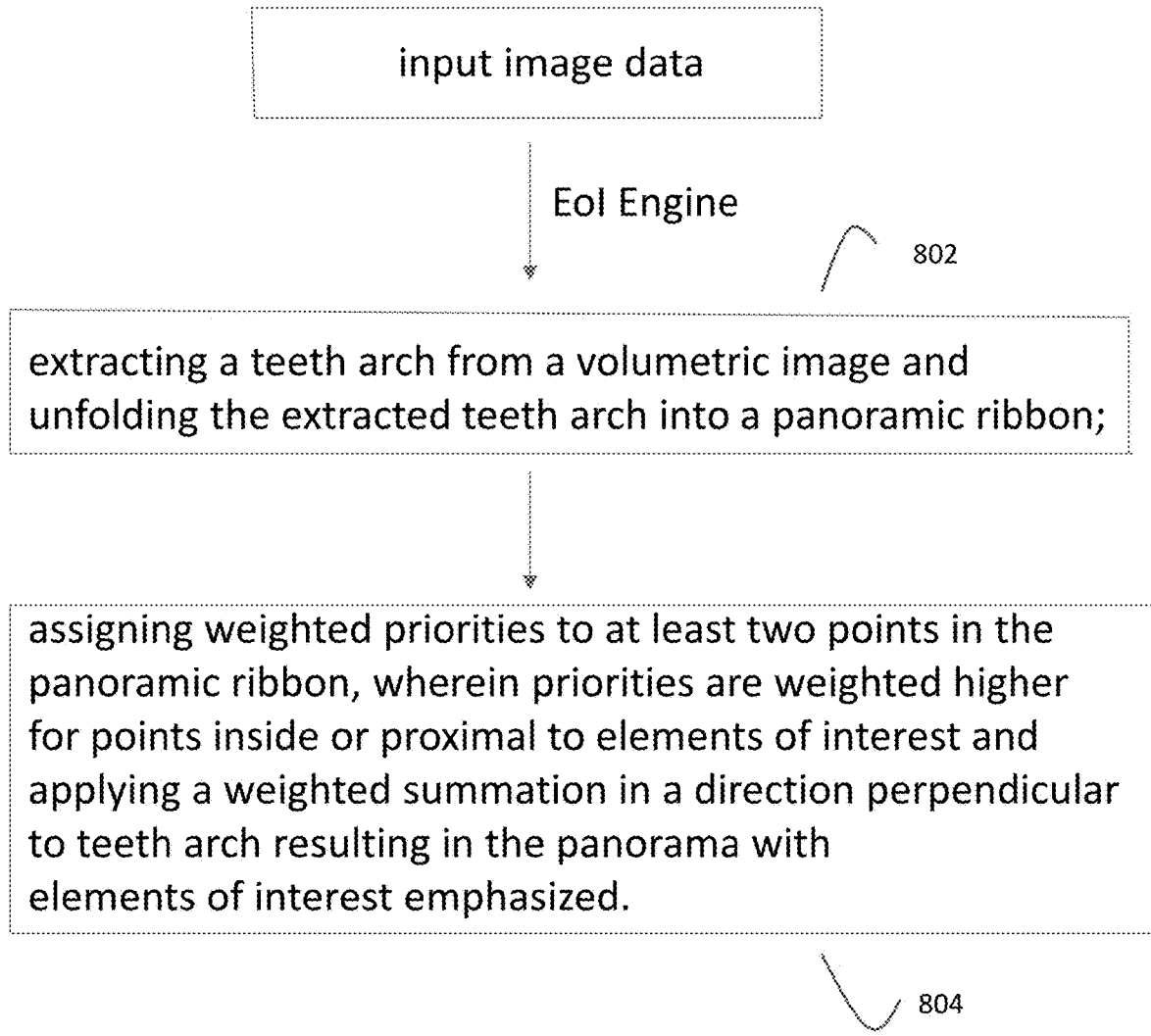
FIG. 8 illustrates a method flow diagram of exemplary steps in the construction of an EoI-focused panorama in accordance with an aspect of the invention.

FIG. 8 illustrates a method flow diagram of exemplary steps in the construction of an EoI-focused panorama in accordance with an aspect of the invention. It is to be understood that references to anatomical structures may also assume image or image data corresponding to the structure. For instance, extracting a teeth arch translates to extracting the portion of the image wherein the teeth arch resides, and not the literal anatomical structure. FIG. 8 generally illustrates a method of steps for constructing a 2D panoramic image from a 3D CBCT study. More specifically, in one embodiment, disclosed is a method for constructing a panorama of teeth arch with elements of interest emphasized. In a preferred embodiment, the method comprises the step of: (1) extracting a teeth arch from a volumetric image and unfolding the extracted teeth arch into a panoramic ribbon 802; and step (2) assigning weighted priorities to at least two points in the panoramic ribbon, wherein priorities are weighted higher for points inside or proximal to elements of interest (EoI) and applying a weighted summation in a direction perpendicular to teeth arch resulting in the panorama with EoI emphasized 804.

The construction of the EoI-focused panorama of an oral complex (or more specifically, a teeth arch) is generally achieved in two steps according to one embodiment: The first step concludes in voxel coordinates operations, such as extracting teeth arch and unfolding a study image into 3D panoramic ribbon (curved sub-volume that passes along the teeth arch). Teeth arch is extracted using segmentations of teeth and anatomy, mandible and mandibular canals in particular. Anatomy segmentation may also required to maintain stable extraction in case of missing teeth and to ensure that TMJs and canals are visualized in panorama. Then, construct a transformation grid that allows the arch to unfold in straight line, resulting in a panoramic ribbon. In one embodiment, the transformation grid is a calculation of the coordinates according to the coordinates of the original volumetric image. Once unfolded, in one embodiment, the resulting image is virtually tilted in sagittal plane for frontal teeth apexes to take the most perceptible position. Tilting of the ribbon to maximize perceptibility of a frontal teeth apex is done by calculating the angles of frontal section tilt for both sections, applying the transformations according to the calculated tilt during the process of calculating of the coordinates of a transformation grid, so the panoramic ribbon is tilted virtually in non-distorting manner. Alternatively, the unfolding of the arch in a straight line for generating the ribbon does not require applying a transformation grid. In other embodiments, the unfolding of the arch into the ribbon does not subsequently tilt to maximize frontal teeth apex perceptibility.

Figure 9:
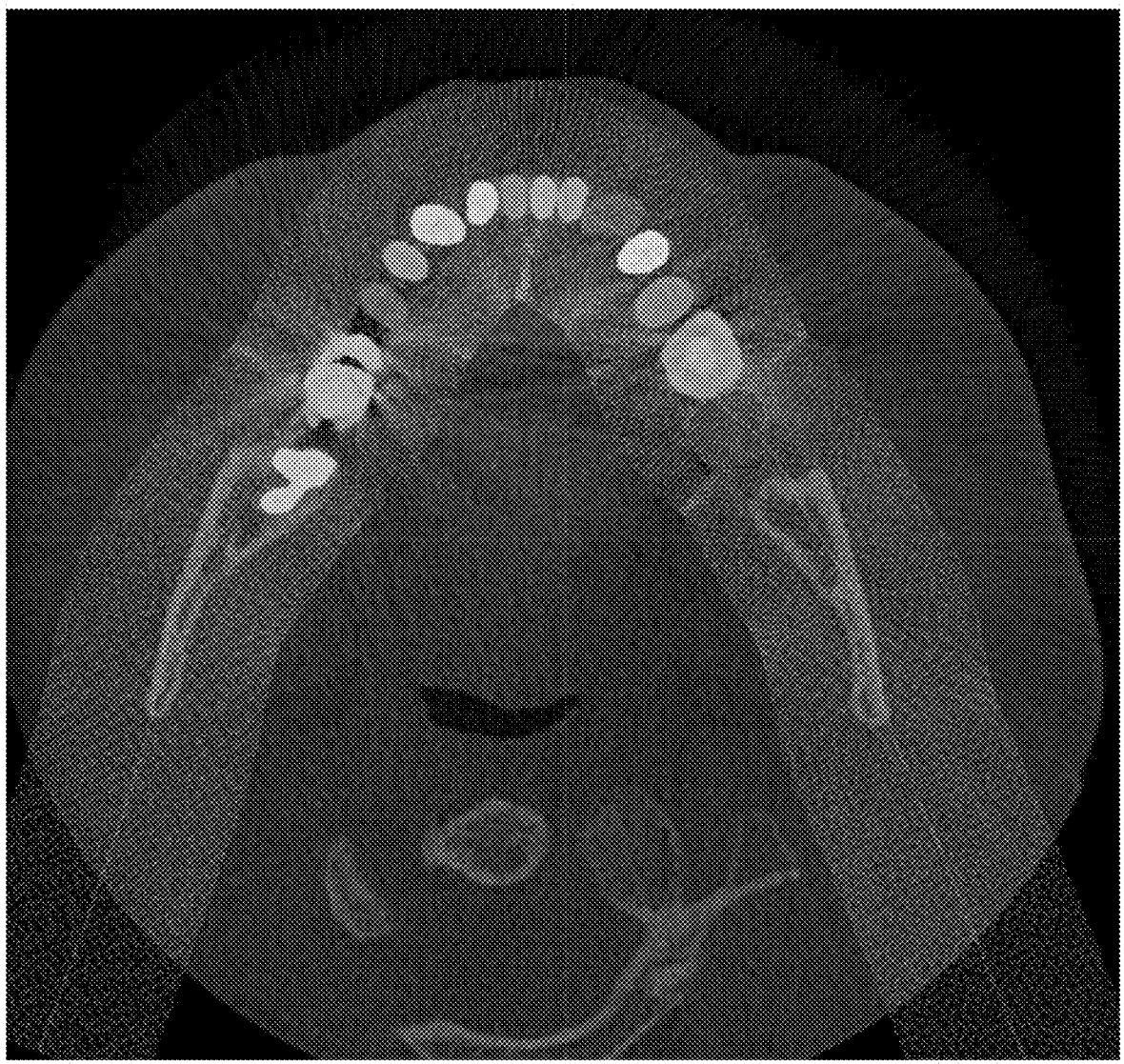
FIG. 9 illustrates in a screen-shot, an exemplary constructed panorama in accordance with an aspect of the invention.

During the second step we assign priorities to each point in panoramic ribbon. Priorities are defined as high in points that are inside or close to regions of interest (such as teeth, bone, and mandibular canals) and as low in points far from them. Final panoramic image is obtained by weighted summation in the direction perpendicular to teeth arch, where weights are priorities. This results in a panorama where elements of interest are emphasized in non-distorting manner, as illustrated in FIG. 9 (screen-shot of an exemplary constructed EoI-focused panorama in accordance with an aspect of the invention). In general, two types of panoramas may be constructed using the above mentioned method: (1) a general panorama; and (2) a split panorama. A general panorama includes RoI for all the teeth present, a whole mandible with TMJs, and a lower part of maxilla with sinuses cropped to the middle. A split panorama is constructed for both jaws separately and is focused only on teeth—as shown in FIG. 9. Alternatively, a method for generating a split or general panorama may be done with the following steps, beginning with (1) combining teeth and mandible segmentations; (2) building an axial projection of segmentation combination; (3) building a skeleton of the axial projection; (4) dividing the skeleton into all possible paths; (5) taking a longest path; (6) ensuring that this path is long enough to cover TMJs, if they are present; (7) smoothing the path; and then (8) returning it as the teeth arch.

While not illustrated in FIG. 8, one embodiment of the method flow may entail: As a first step, receiving an i/v.i (image/volumetric image) further parsed into at least a single image frame field of view by the volumetric image processor. Optionally, the at least single image frame field of view may be pre-processed by controlling image intensity value by the volumetric image processor. As a next step, an anatomical structure residing in the at least single field of view is localized by assigning each p/v (pixel/voxel) a distinct anatomical structure ID by the voxel parsing engine. Next, all p/v belonging to the localized anatomical structure is selected by finding a minimal bounding rectangle around the p/v and the surrounding region for cropping as a defined anatomical structure by the localization layer. Optionally, a visual report may be reconstructed with defined and localized anatomical structure. Also optionally, conditions for each defined anatomical structure may be classified within the cropped image by the classification layer. Next, extracting a teeth arch from the localized image generated and unfolding the extracted teeth arch into a panoramic ribbon; and finally, assigning weighted priorities to at least two points in the panoramic ribbon, wherein priorities are weighted higher for points inside or proximal to elements of interest (EoI) and applying a weighted summation in a direction perpendicular to teeth arch resulting in the panorama with EoI emphasized.

Figure 10:
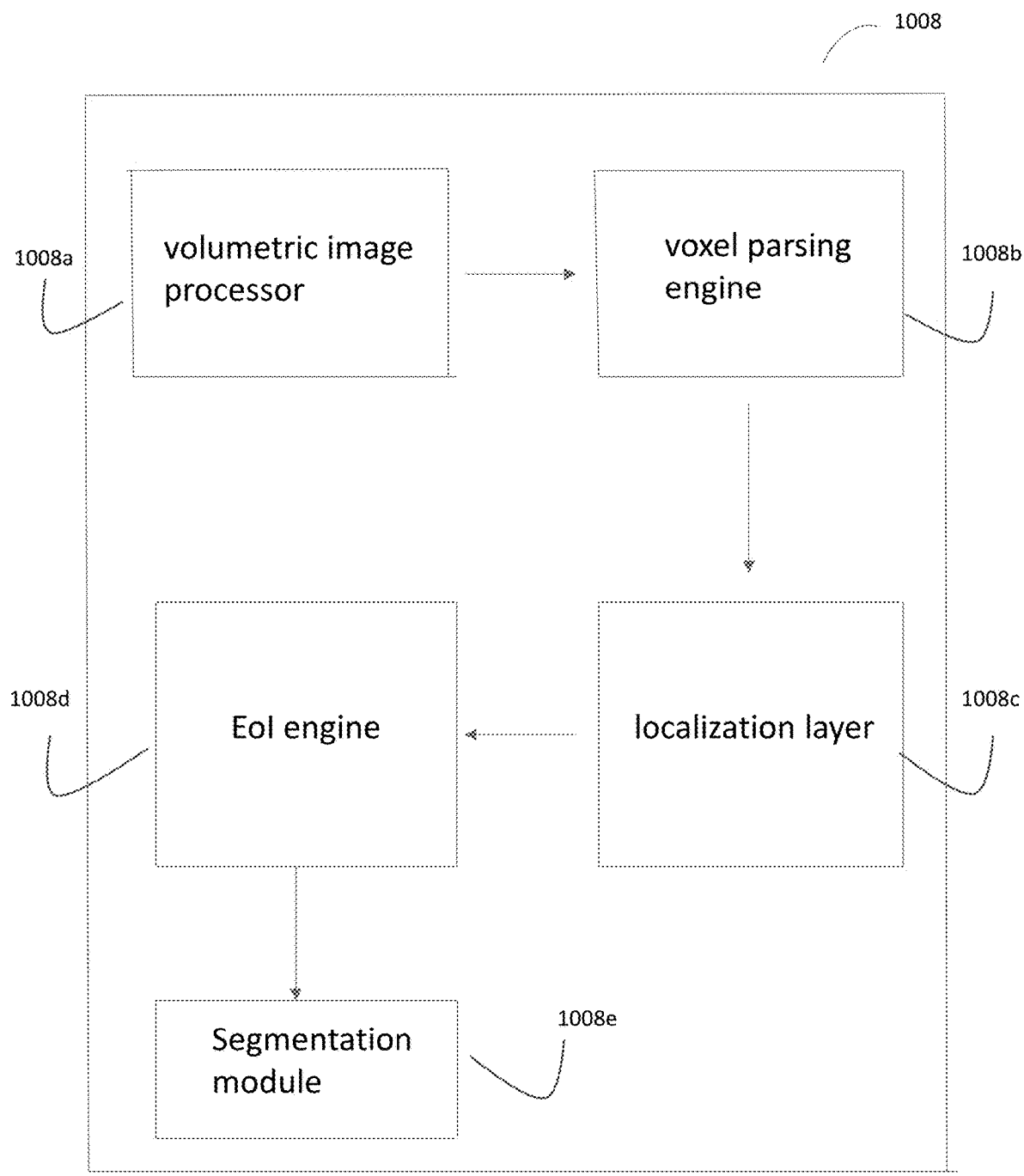
FIG. 10 depicts a system block diagram of the EoI-focused panorama construction in accordance with an aspect of the invention.

Now in reference to FIG. 10—depicting a system block diagram of the EoI-focused panorama construction in accordance with an aspect of the invention. A system for constructing an Elements of Interest (EoI)-focused panorama may comprise: a processor 1008; a non-transitory storage element coupled to the processor 1008; encoded instructions stored in the non-transitory storage element, wherein the encoded instructions when implemented by the processor 1008, configure the system to: extract a teeth arch from a volumetric image; unfold the extraction into a panoramic ribbon; assign weighted priorities to each point in the ribbon, wherein priorities are weighted higher for points inside or proximal to an EoI; and apply a weighted summation in a direction perpendicular to teeth arch, resulting in the panorama with the EoI emphasized.

As shown in FIG. 10, the system may comprise: a volumetric image processor 1008*a*, a voxel parsing engine 1008*b*, a localization layer 1008*c*, an EoI engine 1008*d*, an instance segmentation module 1008*e*, wherein the system, and more particularly, the EoI engine 1008*d* may be configured to: extract a teeth arch from a volumetric image; form a study image from the extract; unfold the study image into a panoramic ribbon; tilt the ribbon for maximal frontal teeth exposure; assign weighted priorities to at least two points in the ribbon, wherein priorities are weighted higher for points inside or proximal to EoI; apply a weighted summation in a direction perpendicular to teeth arch resulting in the panorama with EoI emphasized; and apply the instance segmentation module 1008*e* to accurately provide a segmentation mask and numbering with EoI emphasized.

In one embodiment, the teeth arch is extracted using segmentations of at least one of a teeth or anatomy by the EoI engine 1008*d*. Alternatively, the teeth arch extraction is done by an algorithm that combines teeth and mandible segmentations, extracts the teeth arch landmarks in 2D plane, fits a pre-defined function in form of a default teeth arch to the extracted landmarks, and returns a fitted function as the teeth arch. In one embodiment, the panoramic ribbon is a curved sub-volume passing along the teeth arch, created from unfolding the image of the extracted teeth arch. Alternatively, the extension of the teeth arch from 2D plane to 3D is done by an algorithm that extracts vestibuloral slices from a curved sub-volume of teeth and anatomy segmentations passing along the 2D teeth arch; construct a vertical curve that approximates position and tilt of upper and lower teeth and anatomy on each axial level at each vestibulooral slice; combine the extracted vertical curves in a way that points of each curve on each axial level resulting in a 2D teeth arch specific for a given axial level; and return a vertical curve combination as a 3D teeth arch.

In an embodiment, once the 3D panoramic ribbon is generated, priorities are assigned to a plurality of points arbitrarily chosen on the panoramic ribbon. The arbitrarily chosen points are evenly spaced along the length of the panoramic ribbon. In other embodiments, the points may not be chosen arbitrarily, but rather, according to a pre-defined rule. The elements of interest may be at least one of a bone, tooth, teeth, or mandibular canals. wherein weights are assigned highest to points inside or most proximal to elements of interest with a pre-defined highest value.

While not shown in FIG. 10, in another embodiment, the system may be configured to receive input image data from a plurality of capturing devices, or input event sources. A processor, including or in addition to, an image processor, a voxel parsing engine, a localization layer, and an EoI Engine may be comprised within the system. An image processor may be configured to parse the captured image into each image frame and, optionally, preprocess the parsed image. A voxel parsing engine may be configured to localize an anatomical structure residing in the at least single field of view by assigning each p/v a distinct anatomical structure ID. The localization layer may be configured to select all p/v belonging to the localized anatomical structure by finding a minimal bounding rectangle around the p/v and the surrounding region for cropping as a defined anatomical structure. Optionally, a detection module may be configured to detect the condition of the defined anatomical structure. Also, optionally, the detected condition could be sent to the cloud/remote server, for automation, to EMR and to proxy health provisioning. In another embodiment, detected condition could be sent to controllers, for generating reports and updates, dashboard alerts, export option or store option to save, search, print or email and sign-in/verification unit. Once localized, the EoI engine may be configured to: extract a teeth arch from the localized image; optionally, form a study image from the extract; unfold the extracted teeth arch, or optionally, the study image into a panoramic ribbon; tilt the ribbon for maximal frontal teeth exposure; assign weighted priorities to at least two points in the ribbon, wherein priorities are weighted higher for points inside or proximal to EoI; apply a weighted summation in a direction perpendicular to teeth arch resulting in the panorama with EoI emphasized; and, optionally, apply the instance segmentation module to accurately provide a segmentation mask and numbering with EoI emphasized.

In one embodiment, a segmentation module 1008e (optionally, an instance segmentation module), operating over 2D panoramic image plane, provides accurate teeth segmentation masks and numbering to a corresponding 3D CBCT image. The initial step is to segment teeth instances on an automatically generated panoramic image. Using state-of-the-art 2D instance segmentation deep learning models (R-CNN detectors), 1) localize teeth in 2D bounding boxes; 2) assign a number to each detected tooth in accordance with the dental formula; and 3) provide accurate 2D masks to each detected tooth. To train 2D instance segmentation module, utilize the mixture of the annotated OPT and panoramic images generated from CBCT, obtained as an output of our automatic panoramic generator. With the assistance of the 3D panoramic ribbon, retrieve 3D bounding boxes, inferred from the 2D panoramic instances, defining correspondence between 2D and 3D bounding boxes coordinates. The 3D bounding boxes (as regions of interest) are further submitted to 3D segmentation module, to obtain accurate 3D teeth masks in the original CBCT fine scale.

In further clarification, using one of the module's output (3D-UNet or 3D-R-CNN), use teeth masks to automatically construct panoramic surface, which defines mathematically; independently project the 3D tooth masks of both modules on a panoramic surface which gives 2D tooth masks projections. In order do this, calculate normal vectors to the panoramic surface and project every pixel of a mask on this surface. In parallel with the previous step, apply the third, 2D R-CNN style instance segmentation model, to the generated panorama image to acquire 2D tooth masks and labels. For every 2D R-CNN mask, pick an instance either from 3D-UNet or 3D-R-CNN. This step is accomplished by calculating an Intersection over Union (IoU) for 2D masks and the projected 3D masks, selecting the best 3D projections for every 2D instance on the panoramic image detected by 2D R-CNN detector. Since the relations between the 3D projected masks and the 3D masks themselves are understood, picking a 3D projected mask infers picking the corresponding 3D mask.

In one embodiment, the segmentation module 1008e (optionally, semantic segmentation modules or 3D U-Nets) is configured to specifically segment localized pathologies, like caries and periapical lesions. We use these segmentation to 1) estimate volume of the lesions to track it size dynamic over time, 2) create very specific visualizations (slice that cuts right at the maximum volume of the lesion), 3) get a "second opinion" network for diagnostics. These networks could also be trained in multi-task fashion, where one network learns to segment multiple types of lesions. A classification module could also be attached to the outputs of any network layer(s) to produce probabilities for lesion or whole-image. In case of whole-image classifier, it could be used to add cheaper weakly labeled data (single whole-image label "image contains lesions"/"image does not contain lesions") to costly segmentation labels (assigning lesion/background to each voxel). These networks typically operate on RoI defined by tooth sub-volume, like the Descriptor. However, non-dental diseases such as tumors and cysts in the jaws may also be diagnosed. In those cases, different RoI, like RoI of the upper/lower jaw, may be used.

Besides teeth, an anatomy of the skull may be segmented: Mandible and maxilla mandibular canal Sinuses, for instance. The combination of anatomy, along with teeth, may be exported as STL models to third party applications. The segmentation of mandibular canal to characterize a tooth's relation with it, e.g. "tooth is really close to canal", may be performed. This is relevant for surgery planning and diagnostics. Furthermore, a mandible and maxilla segmentation may be performed to diagnose gum disease and to select RoI for additional processing (e.g. tooth segmentation). Even furthermore, sinuses may be segmented to select RoI for sinus diagnosis.

A root-canal system localization module may be used to accurately segment all roots, canals inside them and pulp chamber for each presented tooth. A 3D U-Net based CNN architecture may be used to solve a multiclass semantic segmentation problem. Precise roots and canals segmentation affords a diagnostician/practitioner to estimate canals length, their curvature and visualize the most informative tooth slices in any point, direction, and with any size and thickness. This module allows to see and understand the anatomy of dental roots and canals and forms the basis for planning an endodontic treatment.

Gum disease is a loss of bone around a tooth. Inflammation around teeth may cause bone to recede and expose a tooth's roots. Gum disease diagnosis is performed by measuring a bone loss from a cemento-enamel juntion (CEJ, line on tooth's crown where enamel ends) to the beginning of bone envelope. Diagnosis is performed by segmenting 1) tooth's body, 2) enamel, 3) alveolar bone (tooth's bony envelope), and then algorithmically measuring what part of a tooth between apex and CEJ is covered by the bone.

These are two types of artefacts that may corrupt an image, rendering it unusable for diagnostic purposes. A model developed takes in 2D axial patches, centered on teeth, and predicts if the given CBCT is affected by an artefact, and also predicts the intensity of an artefact. If this probability is high, re-taking the image is recommended. In extreme cases, an intensity score may be assigned corresponding to the severity of the artefact.

A model developed finds locations of cephalometric landmarks on CBCT. Based on this, a calculation of cephalometric measurements may be preformed, which are relations (distances and angles) between sets of landmarks. Based on measurements, a screening may be performed, which may signal if patient might have an aesthetic/functional orthodontic problem and would benefit from a consult with an orthodontic.

A report that serves as a guide for implantology planning for a specific area has also been developed. A report consists of a panorama and a group of vestibular slices. A panorama may be constructed using virtual rotation that aligns occlusal plane. A panorama serves as a topogram that shows the locations of every slice. Slices have a tilt that is intended to match the implant placement direction. Some of the slices are provided with measurements that are present only if there is a place for implant. The distance can be estimated 1) as a horizontal plate situated in the implant entrance area that is usually tilted in the implant placement direction, 2) from the center of the plate to the closest point of either mandibular canal or maxillary sinus, 3) as a vertical from the oral end of plate to the farthest point of mandible.

Also developed is an endodontic treatment planning report generated from an uploaded CBCT image and chosen area of interest on the dental formula. A series of slices are then obtained: axial, cross-sectional canal shape, periapical lesions, C-shaped root canal, and root furcation. The report consists of several modules: the panoramic image of upper and/or lower jaw (depends on the region of interest), root canal space, root canal system, root canal shape, function, and periapical lesions. Optionally, a root canal system anatomy may be assessed and an evaluation of possible endodontic pathology. Further optionally, a report may be generated, which can be stored or handed over to the patient.

A report may be generated that provides necessary visual information about a specific third molar using the knowledge of tooth location. A report consists of three slice sections that differ in slice orientation: vestibular, axial, and mesiodistal slices. Every slice section has a topogram image that shows slice locations. A mandibular canal segmentation may be performed to visualize its location on topograms to notify a surgeon about tooth-canal relation.

As a part of mandible/maxilla, TMJ parts: Condyle and temporal bone (this step is optional, landmarks could be detected) may be segmented. Then, several landmarks on condyle and temporal bone may be detected and distances between them measured. These measurements and their relations, e.g. asymmetry, may be a basis for TMJ diagnosis and referral for additional study via MRI. TMJ disorders can cause pain and are typically counter-indications for orthodontic treatment.

Similar to pathology localizers, a model has been developed that will segment pathologies on panoramic radiograph. It operates over the entire image or inside a tooth RoI (bounding box predicted by OPT localizer). Any type of 2D segmentation network can be used, e.g. UNet. After pathology segmentation is obtained, assign pathologies to tooth by selecting those that are inside predicted tooth mask or are immediately adjacent to it.

Superimposition of several CBCTs are important for assessing changes between two time points. This may be performed in one of the following ways:
1) General SI: predict ceph landmarks and orient one image onto another by minimizing the distance between individual ceph points on the image.
2) During superimposition, some landmarks can be ignored if they are significantly changed, i.e., we minimize distance between points EXCEPT N points that have maximum distances after algorithm has converged.
3) Tooth-related SI: predict some tooth landmarks, like apex/radix points, furcation points, crown "bumps" and "fissures". Then do minimization of distances.
4) Generic mask-based SI: select some region, e.g., region around the tooth, and segment anatomy in it. Put a fine grid over this region. For each grid point, see which anatomical area is detected there. Then do SI by minimizing distances between all similar anatomical regions and maximizing distance between dissimilarones.

A localizer-descriptor pipeline for segmentation of teeth+ detection of pathologies for intraoral x-rays (bitewing, periapical, occlusal images) has also been developed. The pipeline is similar to the CBCT/OPT described above (localizer/descriptor pipeline). The pipeline may also be configured for segmentation of teeth+detection of pathologies for intraoral photography (optical-visible light-based). Developed also is a localizer-descriptor pipeline for segmentation of teeth+ detection of pathologies for intraoral optical scans (3D surface obtained with highly precise laser depth sensor and configured for optical texture-visible light-display).

Developed is a module that creates 3D models from tooth and anatomy masks. It uses marching cubes algorithm followed by laplacian smoothing to output a 3D mesh, which is later saved to STL. Certain anatomical objects can be grouped together to provide a surface containing selected objects (e.g. jaw+all teeth except one that is marked for extraction, for the purposes of a separate 3D-printing a surgical template for precise drilling of the implant hole).

Finally, a module that co-registers CBCT and IOS taken at the same time has been developed: Input is CBCT and IOS in separate coordinate systems. The output is IOS translated to coordinate system of CBCT. IOS have higher resolution, while CBCT displays the insides of the tooth/jaw. This is achieved by detecting the same dental landmarks (distinct points on teeth) on CBCT and IOS; at which point, minimize the distance between same points on CBCT and on IOS, which will give a coordinate transform to apply to IOS.

Advantageously, the present invention provides an end-to-end pipeline for detecting state or condition of the teeth in dental 3D CBCT scans. The condition of the teeth is detected by localizing each present tooth inside an image volume and predicting condition of the tooth from the volumetric image of a tooth and its surroundings. Further, the performance of the localization model allows to build a high-quality 2D panoramic reconstruction—with EoI focused—which provides a familiar and convenient way for a dentist to inspect a 3D CBCT image. The performance of the pipeline—with image processor, parsing engine, localization layer, EoI engine, and segmentation modules—is improved by adding i/v.i data augmentations during training;

reformulating the localization task as instance segmentation instead of semantic segmentation; reformulating the localization task as object detection, and use of different class imbalance handling approaches for the classification model. Alternatively, the jaw region of interest is localized and extracted as a first step in the pipeline. The jaw region typically takes around 30% of the image/image volume and has adequate visual distinction. Extracting it with a shallow/small model would allow for larger downstream models. Further, the diagnostic coverage of the present invention extends from basic tooth conditions to other diagnostically relevant conditions and pathologies.

Figure 11:
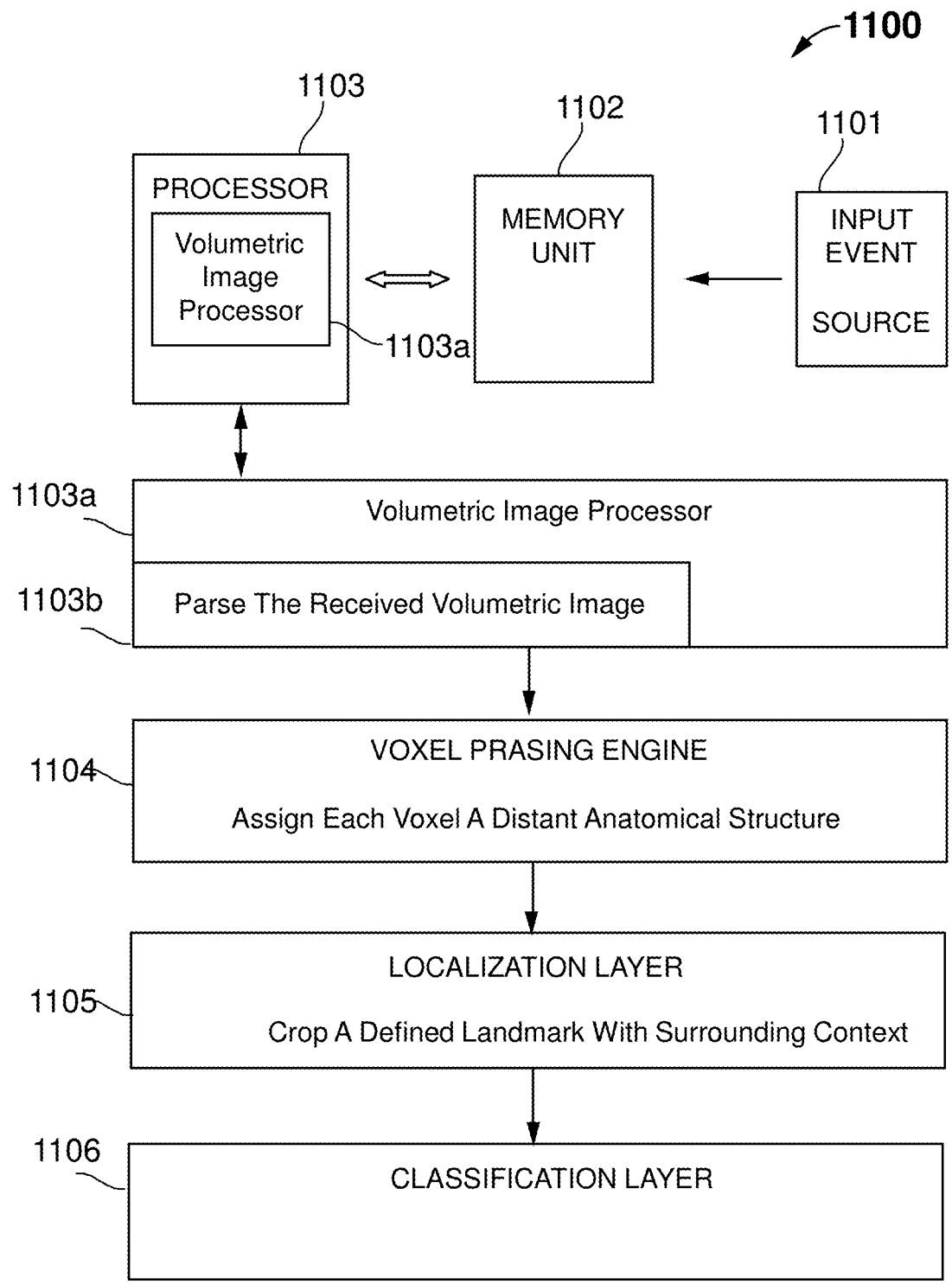
FIG. 11 depicts a system block diagram of the automated parsing pipeline for landmark localization and condition classification in accordance with an aspect of the invention.

FIG. 11 illustrates in a block diagram, an automated parsing pipeline system for landmark localization and condition classification 1100 in accordance with an aspect of the invention. In an embodiment, the system comprises an input system 1101, a memory system or unit 1102, and a processor system 1103. As shown, the processor system 1103 comprises a volumetric image processor 1103a, a voxel parsing engine 1104 in communication with the volumetric image processor 1103a, a localization layer 1105 in communication with the voxel parsing engine 1104 and a classification layer 1106 in communication with the localization layer 1105. The processor 1103 is configured to receive at least one i/v.i via an input system 1101. At least one received i/v.i, which may be comprised of a 2-D or 3-D image. The pixel array is optionally pre-processed to convert into an array of Hounsfield Unit (HU) radio intensity measurements. Then, the processor 1103 is configured to parse the received i/v.i into at least a single image frame by the said volumetric image processor 1103a.

The landmark structures residing in the at least single field of view is localized by assigning each p/v a distinct landmark structure by the voxel parsing engine 1104. The processor 1103 is configured to select all p/v belonging to the localized landmark structure by finding a minimal bounding rectangle around the p/v and the surrounding region for cropping as a defined landmark structure by the localization layer 1105. Then, the conditions for each defined landmark structure within the cropped image is classified by a detection module or classification layer 1106. In one embodiment, the classification is achieved using any one of a FCN/CNN, such as a DenseNet 3-D convolutional neural network—or alternatively, by processing anthropomorphic features within the defined landmark or between landmarks. In some embodiments, the defined landmarks targeted for localization and classification may be landmarks comprising features associated with a pathological significance. In other embodiments, the targeted landmarks for localization and classification are not associated with a pathological significance, but rather are standard dental landmarks:

Exemplary Dental Anatomical Landmarks:
Fauces—Passageway from oral cavity to pharynx.
Frenum—Raised folds of tissue that extend from the alveolar and the buccal and labial mucosa.
Gingiva—Mucosal tissue surrounding portions of the maxillary and mandibular teeth and bone.
Hard palate—Anterior portion of the palate which is formed by the processes of the maxilla.
Incisive papilla—A tissue projection that covers the incisive foramen on the anterior of the hard palate, just behind the maxillary central incisors.
Maxillary tuberosity—A bulge of bone posterior to the most posterior maxillary molar.
Maxillary/Mandibular tori—Normal bony enlargements that can occur either on the maxilla or mandible.
Mucosa—Mucous membrane lines the oral cavity. It can be highly keratinized (such as what covers the hard palate), or lightly keratinized (such as what covers the floor of the mouth and the alveolar processes) or thinly keratinized (such as what covers the cheeks and inner surfaces of the lips).
Palatine rugae—Firm ridges of tissues on the hard palate.
Parotid papilla—Slight fold of tissue that covers the opening to the parotid gland on the buccal mucosa adjacent to maxillary first molars.
Pillars of Fauces—Two arches of muscle tissue that defines the fauces.
Soft palate—Posterior portion of the palate. This is non-bony and is comprised of soft tissue.
Sublingual folds—Small folds of tissue in the floor of the mouth that cover the openings to the smaller ducts of the sublingual salivary gland.
Submandibular gland—Located near the inferior border of the mandible in the submandibular fossa.
Tonsils—Lymphoid tissue located in the oral pharynx.
Uvula—A non-bony, muscular projection that hangs from the midline at the posterior of the soft palate.
Vestibule—Space between the maxillary or mandibular teeth, gingiva, cheeks and lips.
Wharton's duct—Salivary duct opening on either side of the lingual frenum on the ventral surface of the tongue.

In one embodiment, the pipeline 110 is configured to classify each p/v as one of a feature/landmark and resulting segmentation assigns each p/v to one of a landmark class. In one embodiment, the system utilizes fully-convolutional network to perform at least one of the localization, anthropomorphic measurements, or condition classification. In one embodiment, the system comprises FCN/CNN (such as VNet) predicting multiple "energy levels", which are later used to find boundaries. In another embodiment, a recurrent neural network could be used for step by step prediction of landmark. In yet another embodiment, Mask-RCNN generalized to 3D could be used by the system. In yet another embodiment, the system could take multiple crops from 3D image in original resolution, perform instance segmentation, and then join crops to form mask for all original image. In another embodiment, the system could apply either segmentation or object detection in 2D, to segment axial slices. This would allow to process images in original resolution (albeit in 2D instead of 3D) and then infer 3D shape from 2D segmentation.

In one embodiment, the system could be implemented utilizing descriptor learning in the multitask learning framework i.e., a single network learning to output predictions for multiple dental conditions. This could be achieved by balancing loss between tasks to make sure every class of every task have approximately same impact on the learning. The loss is balanced by maintaining a running average gradient that network receives from every class*task and normalizing it. Alternatively, descriptor learning could be achieved by teaching network on batches consisting data about a single condition (task) and sample examples into these batches in such a way that all classes will have same number of examples in batch (which is generally not possible in multitask setup). Further, standard data augmentation could be applied to 3D tooth images to perform scale, crop, rotation, vertical flips. Then, combining all augmentations and final image resize to target dimensions in a single affine transform and apply all at once.

In some embodiments, the system could use coarse segmentation mask from localizer as an input instead of tooth image. In some embodiments, the descriptor could be trained to output fine segmentation mask from some of the intermediate layers. In some embodiments, the descriptor could be trained to predict tooth number. As an alternative to multitask learning approach, "one network per condition" could be employed, i.e. models for different conditions are completely separate models that share no parameters. Another alternative is to have a small shared base network and use separate subnetworks connected to this base network, responsible for specific conditions/diagnoses.

Figure 12:
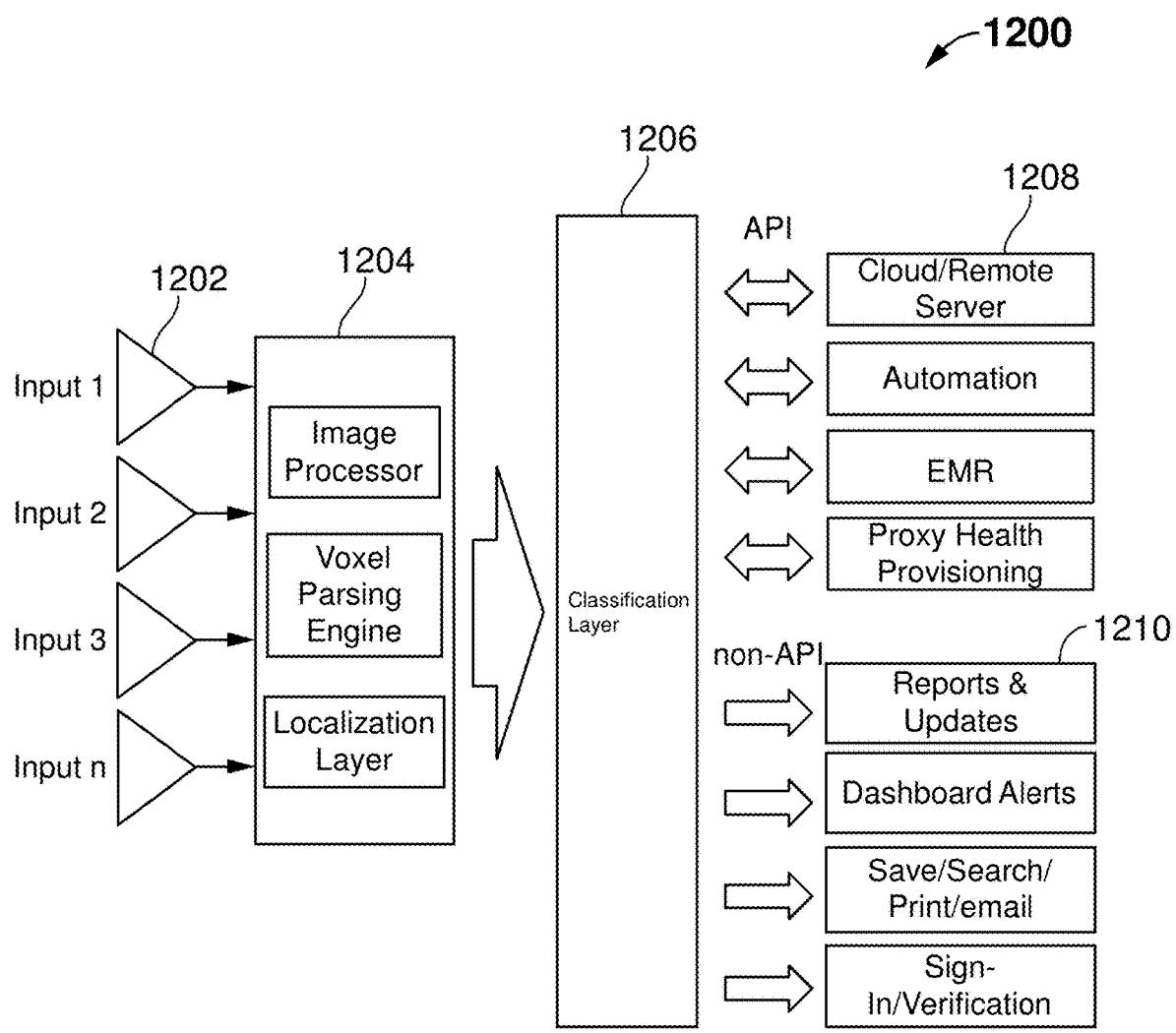
FIG. 12 depicts an interaction flow diagram of the automated parsing pipeline for landmark localization and condition classification in accordance with an aspect of the invention.

FIG. 12 depicts an interaction flow diagram of the automated parsing pipeline for landmark localization and condition classification in accordance with an aspect of the invention. In one embodiment (shown), the system is configured to receive input image data from a plurality of capturing devices, or input event sources 1202. A processor 1204 including at least an image processor, a voxel parsing engine 1204 and a localization layer 1204 is configured to parse image/s into each image frame and localize a landmark structure (of anatomical or pathological significance) residing in the at least single (optionally, pre-processed) field of view/parsed frame by assigning each p/v a distinct landmark structure ID. The localization layer 1204 is configured to select all p/v belonging to the localized landmark structure by finding a minimal bounding rectangle around the p/v and the surrounding region for cropping as a defined landmark structure. The detection module or classification layer 1206 is configured to detect the condition of the defined landmark structure by making various measurements of at least one of a detected feature within a defined landmark, between detected features within a defined landmark, or between detected features between defined landmarks. In another embodiment, the condition is detected by the classification layer 1206 performing any one of a FCN/CNN, such as a DenseNet 3-D convolutional neural network.

In one embodiment, the detected condition could be sent to the cloud/remote server/third-party, for automation, to EMR and to proxy health provisioning 1208. In another embodiment, the detected condition could be sent to a server for generation of reports and updates, dashboard alerts, export option or store option to save, search, print or email and sign-in/verification unit without a need for an API 1210.

Figure 13:
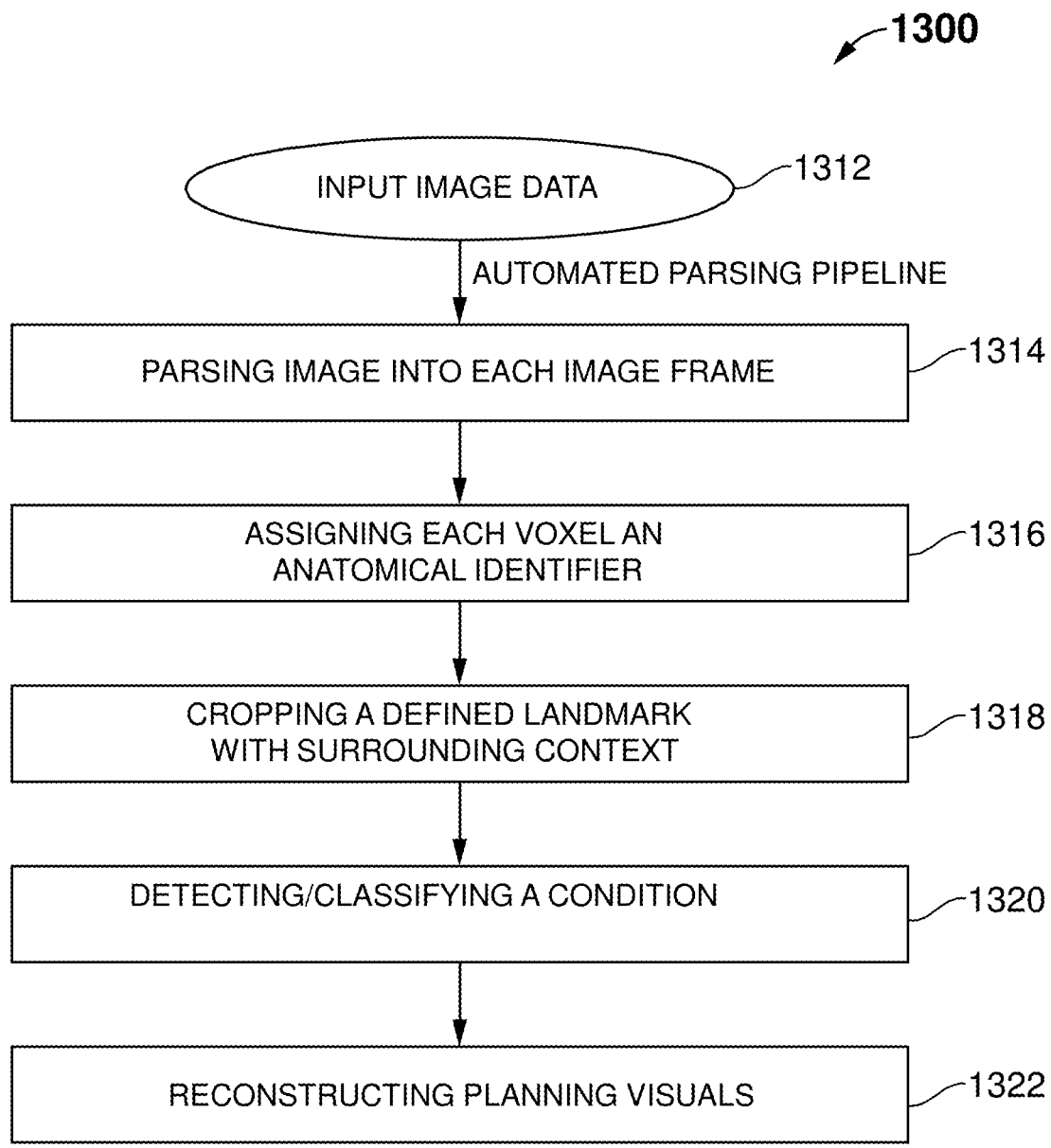
FIG. 13 depicts a method flow diagram of the automated parsing pipeline for landmark localization and condition classification in accordance with an aspect of the invention.

FIG. 13 illustrates a method flow depicting the steps of the automated parsing pipeline for landmark localization and condition classification in accordance with an aspect of the invention. At step 1312, an input image data is received. Next, at step 1314, the received i/v.i is parsed into at least a single image frame field of view. Optionally, the parsed i/v.i is pre-processed either by controlling image intensity value; rescaling using linear interpolation; or converting the 3-D pixel array into an array of Hounsfield Unit (HU). At step 1316, a landmark structure or landmark features inside the parsed i/v.i is localized and identified by landmark number (standardized or arbitrary). Furthermore, a landmark structure residing in the at least single field of view is localized by assigning each p/v a distinct landmark structure ID by the voxel parsing engine. At step 1318, the identified landmark/features and surrounding context within the localized i/v.i are extracted; all p/v belonging to the localized landmark structure is selected by finding a minimal bounding rectangle around the p/v and the surrounding region for cropping as a defined landmark structure by the localization layer. At step 1320, conditions for each defined landmark structure is classified within the cropped image by the classification layer performing deep learning techniques or anthropomorphic measurements. At step 1322, a visual report/dashboard analytics may be created with localized and defined landmark structure. In some embodiments, the visual reports include, but not limited to, an endodontic report (with focus on tooth's root/canal system and its treatment state), an implantation report (with focus on the area where the tooth is missing), and a dystopic tooth report for tooth extraction (with focus on the area of dystopic/impacted teeth).

In one embodiment, the classifier, or classifying module, or classification layer, or even detection module may perform anthropomorphic measurements by any of: measuring a distance between at least two points; measuring an angle between three points in three-dimensional space; measuring a distance between a plane defined by three points; any other kind of measurement of relation between any sets of points. Furthermore, anthropomorphic classifying may further comprise at least one of comparing previously measured distance or angles to a reference range (threshold parameters); comparing two distances or angles, or comparing a difference of two distances or angles to the reference range (threshold parameters).

For instance, in the event of localizing the landmark or landmark features of a cement-enamel junction (CEJ) and bone attachment points (BAP) of a tooth, the distance measured between the two features above or below a threshold may determine periodontal bone loss. The CEJ point and BAP of a tooth alongside 2, 4 or more sides of the tooth (i.e. buccal, lingual, mesial, distal, buccal-distal, buccal-mesial, or any kind of intermediate points) may be measured in terms of distance between points to define a BAP-CEJ value, which may be indicative of the following diagnosis: "No periodontal bone loss" if <1 mm; "Mild periodontal bone loss" if 1 to 3 mm; "Moderate periodontal bone loss" if 3 to 5 mm; "Severe periodontal bone loss" if more than 5 mm. Actual ranges are extracted from literature and are subject to review/change/tuning. Furthermore, another landmark/landmark feature subject to localization/diagnostic may be cephalometric features on a maxillofacial region, whereby an angle measured between cephalometric features above or below a threshold indicate an orthodontic condition. The anthropomorphic diagnostic may be in lieu of, or in conjunction with, deep neural network applications to further validate a diagnosis—whether periodontal or orthodontic.

The figures illustrate the architecture, functionality, and operation of possible implementations of systems, methods and computer program products according to various embodiments of the present invention. It should also be noted that, in some alternative implementations, the functions noted/illustrated may occur out of the order noted. For example, two blocks shown in succession may, in fact, be executed substantially concurrently, or the blocks may sometimes be executed in the reverse order, depending upon the functionality involved.

Since various possible embodiments might be made of the above invention, and since various changes might be made in the embodiments above set forth, it is to be understood that all matter herein described or shown in the accompanying drawings is to be interpreted as illustrative and not to be considered in a limiting sense. Thus, it will be understood by those skilled in the art that although the preferred and alternate embodiments have been shown and described in accordance with the Patent Statutes, the invention is not limited thereto or thereby.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising." when used in this specification, specify the presence of stated features, integers, steps, operations, elements, and/or components, but do not preclude the presence or addition of one or more other features, integers, steps, operations, elements, components, and/or groups thereof. Additionally, it is to be understood that references to anatomical structures may also assume image or image data corresponding to the structure. For instance, extracting a teeth arch translates to extracting the portion of the image wherein the teeth arch resides, and not the literal anatomical structure.

Some portions of embodiments disclosed are implemented as a program product for use with an embedded processor. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive, solid state disk drive, etc.); and (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-accessible format and hence executable instructions. Also, programs are comprised of variables and data structures that either reside locally to the program or are found in memory or on storage devices. In addition, various programs described may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

The present invention and some of its advantages have been described in detail for some embodiments. It should also be understood that various changes, substitutions and alterations can be made herein without departing from the spirit and scope of the invention as defined by the appended claims. An embodiment of the invention may achieve multiple objectives, but not every embodiment falling within the scope of the attached claims will achieve every objective. Moreover, the scope of the present application is not intended to be limited to the particular embodiments of the process, machine, manufacture, and composition of matter, means, methods and steps described in the specification. A person having ordinary skill in the art will readily appreciate from the disclosure of the present invention that processes, machines, manufacture, compositions of matter, means, methods, or steps, presently existing or later to be developed are equivalent to, and fall within the scope of, what is claimed. Accordingly, the appended claims are intended to include within their scope such processes, machines, manufacture, compositions of matter, means, methods, or steps.

We claim:

1. A method for classifying a dental or maxillofacial condition, said method comprising the steps of:
    parsing a received volumetric image into at least a single image frame;
    localizing a landmark in a patient's dental or maxillofacial region depicted in the at least single image frame, wherein localizing the landmark is achieved by applying a deep neural network to obtain any kind of probability distribution of location of any one of the landmark, said landmark comprising of a feature or features with anatomical or pathological significance; and
    classifying a dental or maxillofacial condition based on measuring a relation between two or more features within and/or between landmarks, wherein the measured relation is based on at least one of: measuring a distance between at least two points and comparing to a reference range; measuring an angle between three points in three-dimensional space and comparing to a reference range; or measuring a distance between a plane defined by three points and comparing to a reference range.

2. The method of claim 1, wherein the landmark features localized are a cement-enamel junction (CEJ) point and bone attachment points (BAP) of a tooth and a distance measured between the two features above or below a threshold determine periodontal bone loss.

3. The method of claim 1, wherein the landmark features localized are cephalometric features on a maxillofacial region and an angle measured between cephalometric features above or below a threshold determine an orthodontic condition.

4. The method of claim 1, wherein the at least one received volumetric image comprises a 3-D pixel array.

5. The method of claim 1, further comprising converting the 3-D pixel array into an array of Hounsfield Unit (HU) radio intensity measurements for pre-processing the received image.

6. The method of claim 5, further comprising rescaling using linear interpolation for pre-processing the received image.

7. The method of claim 5, further comprising normalization schemes to account for variations in intensity for pre-processing the received image.

8. The method of claim 1, further comprising a step of: finding a minimum bounding rectangle around the localized landmark to achieve extraction for classification of a condition.

9. A system for classifying a dental or maxillofacial condition, said method comprising the steps of:
    a processor;
    a non-transitory storage element coupled to the processor;
    encoded instructions stored in the non-transitory storage element, wherein the encoded instructions when implemented by the processor, configure the system to:
    parse a received volumetric image into at least a single image frame; localize a landmark in a patient's dental or maxillofacial region depicted in the at least single image frame, wherein localizing the landmark is achieved by applying a deep neural network to obtain any kind of probability distribution of location of any one of the landmark, said landmark comprising of a feature or features with anatomical or pathological significance; and classify a dental or maxillofacial condition based on measuring a relation between two or more features within and/or between landmarks, wherein the measured relation is based on at least one of: measuring a distance between at least two points and comparing to a reference range; measuring an angle between three points in three-dimensional space and comparing to a reference range; or measuring a distance between a plane defined by three points and comparing to a reference range.

10. The system of claim 9, wherein the landmark features localized are a cement-enamel junction (CEJ) point and bone attachment points (BAP) of a tooth and a distance measured between the two features above or below a threshold determine periodontal bone loss.

11. The system of claim 9, wherein the landmark features localized are cephalometric features on a maxillofacial region and an angle measured between cephalometric features above or below a threshold determine an orthodontic condition.

12. The system of claim 9, wherein the at least one received volumetric image comprises a 3-D pixel array.

13. The system of claim 9, further comprising converting the 3-D pixel array into an array of Hounsfield Unit (HU) radio intensity measurements for pre-processing the received image.

14. The system of claim 9, further comprising rescaling using linear interpolation for pre-processing the received image.

15. The system of claim 9, further comprising normalization schemes to account for variations in intensity for pre-processing the received image.

16. The system of claim 9, further comprising finding a minimum bounding rectangle around the localized landmark for achieving extraction for classification of a condition.

17. A system for classifying a dental or maxillofacial condition, said system comprising:
 a localization layer;
 a classification layer;
 a processor;
 a non-transitory storage element coupled to the processor;
 encoded instructions stored in the non-transitory storage element, wherein the encoded instructions when implemented by the processor, configure the system to:
 localize a landmark in a patient's dental or maxillofacial region depicted in a parsed image frame by the localization layer, wherein the localizing is indicated by a minimum bounding rectangle around the landmark, said landmark comprising of a feature or features with anatomical or pathological significance; and
 classify a dental or maxillofacial condition based on measuring a relation between two or more features within and/or between landmarks, wherein the measured relation is based on at least one of: measuring a distance between at least two points and comparing to a reference range; measuring an angle between three points in three-dimensional space and comparing to a reference range; or measuring a distance between a plane defined by three points and comparing to a reference range.

\* \* \* \* \*